US010338578B2

(12) United States Patent
Thwaites et al.

(10) Patent No.: US 10,338,578 B2
(45) Date of Patent: Jul. 2, 2019

(54) METHODS, APPARATUSES, AND SYSTEMS FOR HUMAN MACHINE INTERFACE (HMI) OPERATIONS

(71) Applicant: TRANSOCEAN INNOVATION LABS LTD, George Town (KY)

(72) Inventors: Kurt Thwaites, Houston, TX (US);
Steven Hand, Houston, TX (US);
Kevin Hoffmann, Pittsburgh, PA (US);
Nate Bishop, Pittsburgh, PA (US);
Bridget Monahan, Pittsburgh, PA (US);
Amy Ferchak, Pittsburgh, PA (US);
Jeffrey A. Senn, Pittsburgh, PA (US)

(73) Assignee: Transocean Innovation Labs Ltd., Grand Cayman (KY)

( * ) Notice: Subject to any disclaimer, the term of this patent is extended or adjusted under 35 U.S.C. 154(b) by 231 days.

(21) Appl. No.: 15/449,447

(22) Filed: Mar. 3, 2017

(65) Prior Publication Data
US 2017/0255192 A1 Sep. 7, 2017

Related U.S. Application Data

(60) Provisional application No. 62/344,105, filed on Jun. 1, 2016, provisional application No. 62/303,968, filed on Mar. 4, 2016.

(51) Int. Cl.
*G05B 23/02* (2006.01)
*G06F 3/0481* (2013.01)
(Continued)

(52) U.S. Cl.
CPC ..... *G05B 23/0289* (2013.01); *G05B 23/0272* (2013.01); *G06F 3/0482* (2013.01);
(Continued)

(58) Field of Classification Search
CPC .......... G05B 23/0289; G05B 23/0272; G06F 3/04817; G06F 3/0482; G06F 3/04847; G06F 3/04845; G06F 3/0488
See application file for complete search history.

(56) References Cited

U.S. PATENT DOCUMENTS

2003/0182083 A1    9/2003   Schwenke .................. 702/183
2007/0240052 A1*  10/2007   Sherrill ................. G06F 3/048
                                                      715/700
(Continued)

OTHER PUBLICATIONS

International Search Report and Written Opinion in International Application No. PCT/US2017/020673 dated May 22, 2017.

*Primary Examiner* — Sean Shechtman
*Assistant Examiner* — Shon G Foley

(57) ABSTRACT

Methods, apparatuses, systems, and implementations of an HMI control system for BOP rigs are disclosed. At least some versions of the disclosed systems enable a user to configure interface settings, perform actions on a BOP stack, view diagnostics, perform testing, and observe and rectify alarms. The disclosed systems may enable a user to more efficiently navigate between different interfaces and perform HMI functions due to a control zone configuration. Additionally, the control zone configuration may reduce operator error by assigning certain control zones to particular functions and requiring the user to take affirmative steps to perform destructive functions.

20 Claims, 21 Drawing Sheets

(51) Int. Cl.
*G06F 3/0482* (2013.01)
*G06F 3/0484* (2013.01)
G06F 3/0488 (2013.01)

(52) U.S. Cl.
CPC ...... *G06F 3/04817* (2013.01); *G06F 3/04845* (2013.01); *G06F 3/04847* (2013.01); *G06F 3/0488* (2013.01)

(56) References Cited

U.S. PATENT DOCUMENTS

2014/0151121 A1 6/2014 Boone .............................. 175/27
2014/0311741 A1 10/2014 Tunget .......................... 166/285
2016/0004236 A1 1/2016 Stubbs ........................... 700/49

* cited by examiner

METHODS, APPARATUSES, AND SYSTEMS FOR HUMAN MACHINE INTERFACE (HMI) OPERATIONS

CROSS-REFERENCE TO RELATED APPLICATION

This application claims priority to U.S. Provisional Patent Application 62/303,968 filed Mar. 4, 2016 and 62/344,105 filed Jun. 1, 2016, each of which is incorporated herein by reference in its entirety.

BACKGROUND

1. Field of the Invention

This disclosure relates generally to methods, apparatuses, and systems that can be used to provide a human machine interface (HMI) to control a high-reliability blow-out preventer (BOP) rig.

2. Description of Related Art

Operator error during operations of an HMI interface for a BOP rig can significantly contribute to system downtime and potentially increase safety risk. This can happen due to outright operator error—for example, an operator operating the wrong component, or, more subtly, when operators are confronted with diagnosing several smaller problems instead of dealing with the root cause.

Fault tolerant and redundant systems are often hard for operators to understand and diagnose, at least in part because there can be multiple ways to perform every function. One of the most important aspects to minimizing downtime risk associated with operator error is the sophistication of the master control software for the BOP rig. The master control system must be flexible to allow expert operators to selectively enable and disable such automatic failover to aid in diagnosing problems or operating in unusual situations. This complexity does not come without cost. This fault management approach requires complex software and increases the efforts in validation and testing.

To minimize such downtime, the HMI and control system has been designed with certain guiding principles in mind. The overarching goal of these principles is to make sure every design decision supports the operator's ability to operate safely, make good decisions, and to minimize downtime.

SUMMARY

This disclosure includes embodiments of a computing system for implementing a human machine interface (HMI) application. In some embodiments, the computing system may include a memory device and at least one processor configured to enable the display of a graphical user interface (GUI). The GUI may include one or more graphical elements configured to implement, using the at least one processor, one or more software applications stored on one or more servers. In some embodiments, the one or more software applications may be configured to initiate a session of the HMI application by receiving a user input on a user interface running or stored on a hardware device comprising at least one processor. In some embodiments, the one or more software applications may enable the display of a plurality of non-overlapping zones that may include an action zone and one or more of a high-level navigation zone including one or more selectable navigation options and a system header zone. The one or more software applications may enable the display of a plurality of selectable action options in the action zone including a plurality of non-overlapping subzones. In some embodiments, the subzones may include an interface control subzone, an information subzone, and a system control subzone. The one or more software applications may enable the display of one or more selectable action options that may be displayed in predesignated subzones, wherein the plurality of selectable action options may be modified based on a selection of the one or more selectable navigation options, wherein the selection may be one or more of a user selection and a default selection. In some embodiments, the one or more software applications may receive, at the hardware device, data representing a user selection of one of the one or more selectable action options, and may control an operating state of one or more physical offshore drilling rig components based on the user selection.

In some embodiments, the HMI application may be configured to implement one or more standard operating procedures applicable to one or more offshore drilling rigs. The HMI application may be further configured to receive, at the hardware device, data representing one or more modifications to the one or more standard operating procedures, apply the one or more modifications to the one or more standard operating procedures to create one or more modified standard operating procedures, and apply the one or more modified standard operating procedures to the one or more offshore drilling rigs. In some embodiments, the one or more selectable navigation options may include one or more of a blowout preventer (BOP) stack control option, a diagnostics option, a testing option, a settings option, an alarms option, a diverter option, a surface system option, an electronic riser angle option, and an emergency disconnect option.

In some embodiments, the one or more software applications may be further configured to, after receiving a user selection of the BOP stack control option, enable the display of a layout diagram that may include one or more selectable components in the information subzone and may represent a current stack arrangement of the one or more physical offshore drilling rig components. The one or more software applications may be further configured to enable the display of one or more control options in the interface control subzone that may include one or more control procedures and one or more destructive function control modes.

In some embodiments, the one or more software applications may be further configured to enable the display of one or more visual status displays in the system control subzone and, after receiving a user selection of one of the selectable components or control options, enable the display of one or more function control options in the system control subzone. The one or more function control options may correspond to the user selection of one of the selectable components or control options.

In some embodiments, the one or more software applications may be further configured to enable the display of a flowpath within the layout diagram and enable the display of one or more colors for the flowpath. One or more highlighted colors may correspond to one or more predicted flowpath states of the flowpath such as a predicted fluid flow state and a predicted fluid non-flow state. After receiving a user selection of one of the selectable components or control options, the one or more software applications may enable the display of one or more function control options in the system control subzone corresponding to the user selection of one of the selectable components or control options.

In some embodiments, the one or more software applications may be further configured to receive a user input activating one or more destructive function control modes, receive a user selection of one or more destructive functions, enable the display of a destructive function confirmation option, and upon receipt of a user selection of the destructive function confirmation option, perform one or more actions on one or more physical rig components corresponding to the selected one or more destructive functions. In some embodiments, the one or more destructive functions may include one or more of a pipe cutting action and a BOP disconnect action.

In some embodiments, the one or more software applications may be further configured to, after receiving a user selection of the settings option, enable the display of a drag-and-drop interface that may include one or more component icons located in the interface control subzone that may represent one or more physical rig components. The one or more software applications may enable the display of metadata describing the one or more physical rig components.

In some embodiments, the one or more software applications may be further configured to, after receiving a user selection of the at least one component operation option, receive a user selection of the one or more component icons. The one or more software applications may enable a user to drag the selected one or more component icons onto a layout diagram located in the information subzone that may represent a current stack arrangement of the one or more physical rig components. Upon receipt of the selected one or more component icons onto the layout diagram, the one or more software applications may modify the layout diagram and control a movement operation of the one or more physical rig components into a modified current stack arrangement to match the one or more component icons comprising the modified layout diagram.

In some embodiments, the one or more software applications may be further configured to, after receiving a user selection of the diagnostics option, enable the display of one or more system diagnostic options in the interface control subzone. The one or more system diagnostic options may include one or more of a component diagnostic option, a function diagnostic option, and an event diagnostic option. The one or more software applications may enable the display of one or more control options in the system control subzone corresponding to the user selection of one of the one or more system diagnostic options.

In some embodiments, the one or more software applications may be further configured to, after receiving a user selection of the event diagnostic option, enable a display of an event timeline in the information subzone including a linear display of one or more events corresponding to one or more events logged by the HMI application and showing a causal relationship between the one or more events and one or more user actions. The one or more software applications may enable a display of an event log in the information subzone including a list of the one or more logged events. In some embodiments, the one or more software applications may be further configured to enable a display of a component timeline in the information subzone including a linear display of one or more component statuses corresponding to one or more component status events logged by the HMI application. The one or more software applications may enable a display of a component log in the information subzone including a list of the one or more logged component status events. In some embodiments, the one or more software applications may be further configured to enable a display of a pressure and temperature timeline in the information subzone including a linear display of one or more pressure and temperature statuses corresponding to one or more fluid flow status events logged by the HMI application. The one or more software applications may enable a display of a pressure and temperature log in the information subzone including a list of the one or more logged fluid flow status events.

In some embodiments, the one or more software applications may be further configured to, after receiving a user selection of the testing option, enable the display of one or more system testing type options in the interface control subzone. The one or more system testing type options may include one or more of a function testing option and a pressure testing option. The one or more software applications may enable the display of one or more test information fields in the information subzone including one or more of test status information and test history information and, after receiving a user selection of one of the one or more system testing type options, enable the display of one or more selectable test options. In some embodiments, the one or more software applications may be further configured to, after receiving a user selection of one or more of the one or more selectable test options, perform one or more tests corresponding to the selected one or more selectable test options and delay performing one or more tests corresponding to the unselected one or more selectable test options.

In some embodiments, the GUI may display the action zone in a central portion of the GUI. The GUI may display the interface control subzone on a right side portion of the action zone, in a central portion of the action zone, or on a left side portion of the action zone and may include a single active interface window. In some embodiments, the HMI application may be further configured to enable a display of a color palette comprising a red color and a green color, display a red color to indicate one or more abnormal component states, and display a green color to indicate one or more of an error-free operating status and a physical rig configuration having all rig components correctly configured for a particular rig operation. The one or more events may include one or more of a component failure and an alarm. In some embodiments, the GUI may include a touch screen interface configured to enable a user to select one of the one or more selectable navigation options and one of the one or more selectable action options by touching an icon corresponding to the one or more selectable navigation options or the one or more selectable action options.

In some embodiments, the one or more software applications may be further configured to, after receiving a user selection of the diagnostics option, enable the display of one or more system diagnostic options including one or more of a regulatory compliance option, an operational status option, and an event log option. In some embodiments, the one or more software applications may be further configured to, after receiving a user selection of the regulatory compliance option, enable the display of a diagnostic decision path tree having one or more levels, one or more nodes, and one or more pathways connecting the one or more nodes, each of the one or more nodes having an icon representing a current diagnostic state of one or more rig components. The one or more icons may show a first symbol to indicate one or more abnormal component states and a second symbol to indicate one or more error-free component states. The one or more levels may correspond to one or more rig components and the one or more nodes may correspond to one or more component functions.

In some embodiments, the one or more rig components may comprise one or more of an integrated manifold assembly, a regulator assembly, a common rail, and a rigid conduit and hot line valve package. In some embodiments, the one or more software applications may be further configured to receive a user selection of a level from the one or more levels, enable the display of one or more diagnostic details corresponding to the selected level, and enable the display of one or more functions, each of the one or more functions corresponding to the one or more rig components represented by the selected level.

In some embodiments, a method of implementing a human machine interface (HMI) application may comprise initiating a session of the HMI application by receiving a user input on a user interface running or stored on a hardware device comprising at least one processor. The method may further comprise enabling the display of a plurality of non-overlapping zones including an action zone and one or more of a high-level navigation zone comprising one or more selectable navigation options and a system header zone. The method may further comprise enabling the display of a plurality of selectable action options in the action zone. The action zone may include a plurality of non-overlapping subzones having an interface control subzone, an information subzone, and a system control subzone. The method may further comprise enabling the display of one or more selectable action options in predesignated subzones, wherein the plurality of selectable action options may be modified based on a selection of the one or more selectable navigation options, wherein the selection is one or more of a user selection and a default selection. The method may further comprise receiving, at the hardware device, data representing a user selection of one of the one or more selectable action options and controlling an operating state of one or more physical offshore drilling rig components based on the user selection.

In some embodiments, an apparatus for implementing a human machine interface (HMI) application may include at least one processor configured to initiate a session of the HMI application by receiving a user input on a user interface running or stored on a hardware device comprising at least one processor. The at least one processor may be further configured to receive a user input activating one or more destructive function control modes, receive a user selection of one or more destructive functions, enable the display of a destructive function confirmation option, and, upon receipt of a user selection of the destructive function confirmation option, perform one or more actions on one or more physical offshore rig components corresponding to the selected one or more destructive functions.

The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, or a component of a system, that "comprises," "has," "includes" or "contains" one or more elements or features possesses those one or more elements or features, but is not limited to possessing only those elements or features. Likewise, a method that "comprises," "has," "includes" or "contains" one or more steps possesses those one or more steps, but is not limited to possessing only those one or more steps. Additionally, terms such as "first" and "second" are used only to differentiate structures or features, and not to limit the different structures or features to a particular order.

Any embodiment of any of the disclosed methods, systems, system components, or method steps can consist of or consist essentially of—rather than comprise/include/contain/have—any of the described elements, steps, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

The foregoing has outlined rather broadly certain features and technical advantages of embodiments of the present invention in order that the detailed description that follows may be better understood. Additional features and advantages will be described below. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

The following drawings illustrate by way of example and not limitation. For the sake of brevity and clarity, every feature of a given method or system is not always labeled in every figure related to that method or system. Identical reference numbers do not necessarily indicate an identical feature. Rather, the same reference number may be used to indicate a similar feature or a feature with similar functionality, as may non-identical reference numbers.

DETAILED DESCRIPTION OF ILLUSTRATIVE EMBODIMENTS

Figure 1:
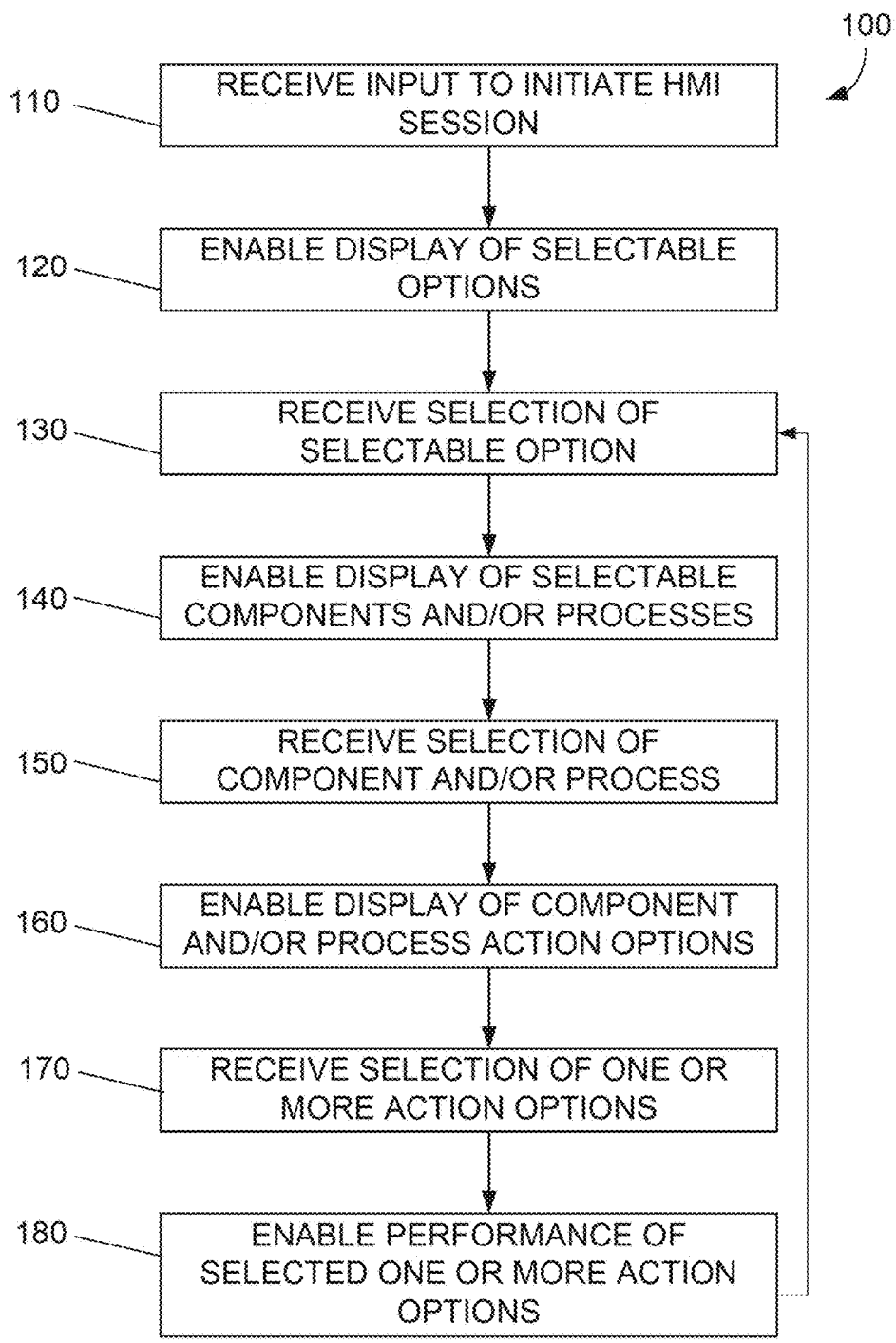
FIG. 1 illustrates an exemplary HMI method according to an embodiment of the disclosure.

Referring now to the drawings, FIG. 1 illustrates an exemplary HMI method 100 according to an embodiment of the disclosure. In the embodiment shown, method 100 may begin at step 110 by receiving a user input to initiate an HMI session. In some embodiments, the system may initiate an HMI session when a user accesses a hardware device. In some embodiments, the hardware device may be connected to a network. The hardware device may be a computer terminal located at an oil rig site or a computer terminal located remotely from an oil rig site. In some embodiments, the oil rig site may be an offshore site and the oil rig may have one or more physical drilling components configured for offshore drilling. In some embodiments, an offshore drilling oil rig may have BOP components. The hardware device may also be a mobile device. The hardware device may be configured to access one or more software applications that perform HMI functionalities. The system may initialize the HMI session when a user accesses a user interface comprising the hardware device. The user interface is defined broadly and may comprise a client device that may access one or more applications stored on one or more server devices. The user interface may also access one or more applications stored locally on the client device.

In the embodiment shown in FIG. 1, the system may continue method 100 at step 120 by enabling the display of a plurality of selectable options to the user. In some embodiments, the display comprises a graphical user interface (GUI) enabling a user to view and interact with one or more display elements on a screen. In some embodiments, the system may enable the display by causing one or more processors configured for display functionality to perform actions that implement the display functionality. In some embodiments, the one or more processors may execute code or initiate one or more software applications that implement the display functionality. In some embodiments, the actions performed by the one or more processors may cause the plurality of selectable options to be displayed to the user via a mobile device and/or computing device. In some embodiments, the selectable options may comprise one or more categories relevant to operating an oil rig. Other selectable options may comprise one or more elements comprising a log display. These options may be displayed as one or more selectable icons located in a predefined portion of the screen and enable the user to easily navigate between the one or more selectable options. The icons may represent the different selectable options available to the user. In the embodiment shown, the system may continue method 100 at step 130 by receiving a user selection of one of the selectable options. In some embodiments, the user may make a selection by selecting an icon corresponding to the category the user desires to access. The user may select elements displayed in the GUI via a keyboard, mouse, touchscreen or touchpad, or in any other suitable manner.

In the embodiment shown, the system at step 140 may enable the display of one or more selectable components and/or processes at the mobile device and/or computing device based on the user selection made from the plurality of selectable options. In some embodiments, the selectable components may be located in a predefined portion of the screen different than the selectable option icons. The selectable processes may be located in a predefined portion of the screen different than the selectable option icons and the selectable components. In some embodiments, the selectable components may be arranged in a layout diagram and may correspond to one or more physical components of an oil rig (e.g., a riser connector, lower marine riser package, blowout preventer stack, blowout preventer, ram, annular, accumulator, test valve, failsafe valve, kill and/or choke line and/or valve, and/or the like). The selectable processes may comprise one or more processes for manipulating physical components of an oil rig and/or performing actions using physical components of the oil rig. The selectable components may comprise selectable icons having symbols defined to represent a particular physical component of the oil rig. In the embodiment shown, the system may continue method 100 at step 150 by receiving a user selection of a selectable component and/or selectable process. The user may make a selection by selecting an icon from the GUI representing a component or a process.

In the embodiment shown, the system at step 160 may enable the display of one or more selectable action options. In some embodiments, action options for a component selection may comprise one or more options for changing a physical configuration of the selected component, activating or deactivating the selected component, and changing various settings of the selected component. Action options for a process selection may comprise one or more steps for performing the selected process. In some embodiments, the action options may be displayed in a predefined portion of the screen different than the selectable option icons, the selectable components, and the selectable processes. The action options may be displayed in such a way as to not obscure other elements displayed in the GUI. In the embodiment shown, the system may continue method 100 at step 170 by receiving a user selection of one or more action options.

In the embodiment shown, the system at step 180 may enable the performance of a particular action or process corresponding to the action option selected by the user and received by the system. In some embodiments, the system controls physical elements of the oil rig and may perform the selected action on appropriate oil rig elements. In the embodiment shown, the system may repeat steps 130-180 as many times as necessary in order to perform all actions the user desires to perform during the HMI session.

FIGS. 2-15 show examples of a GUI that may be displayed on a computing device. The GUI may be used by a user to implement one or more software applications to perform one or more embodiments of method 100 (see FIG. 1). The GUI may be implemented using a suitable operating platform, such as Windows, Android, Apple iOS, or an internal proprietary operating system.

Figure 2:
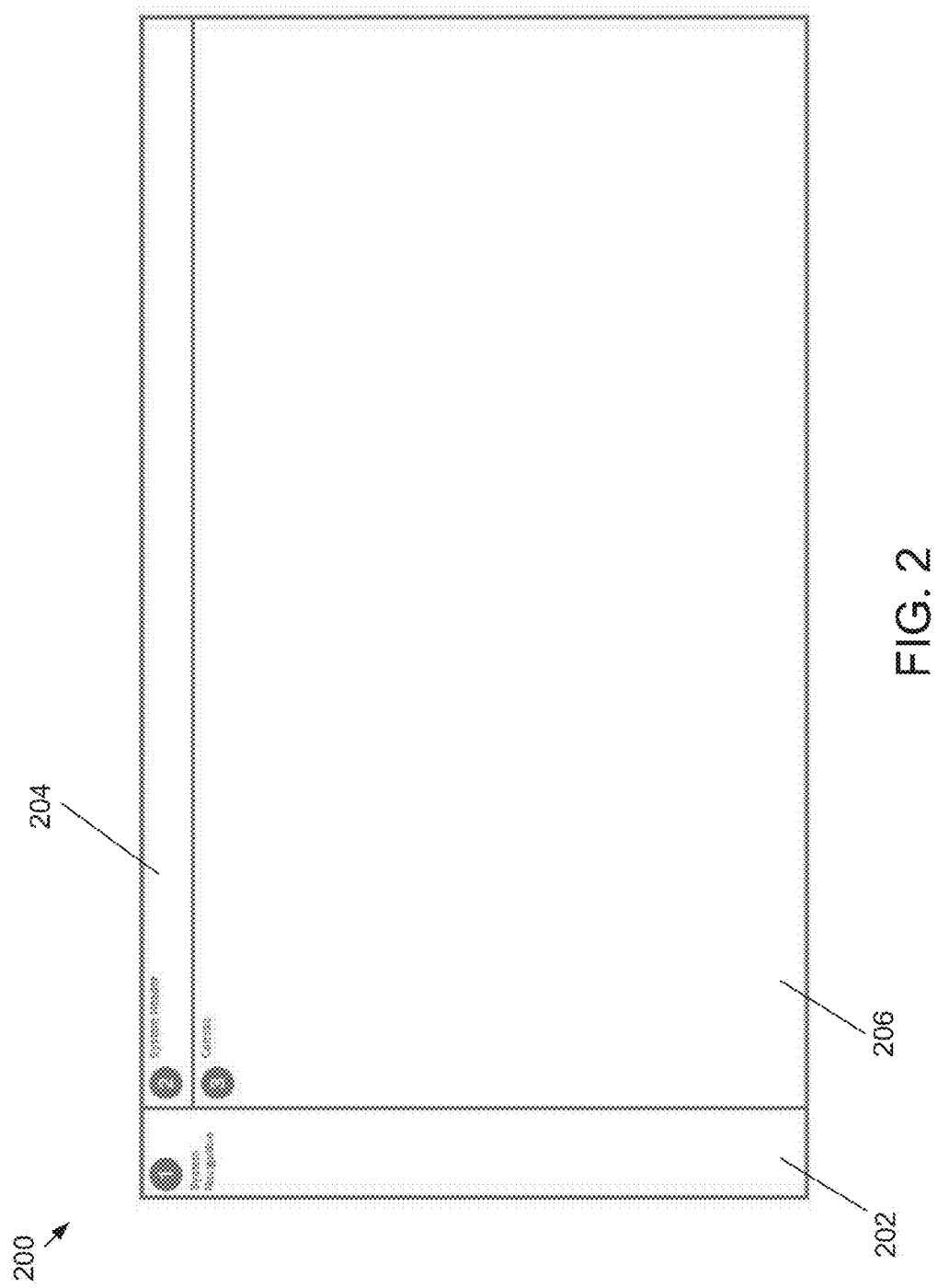
FIG. 2 shows an embodiment of an exemplary user interface architecture having one or more well-defined zones or screen portions for displaying different types of information and controls according to an embodiment of the HMI system.

FIG. 2 shows an embodiment of an exemplary user interface architecture 200 having one or more well-defined zones or screen portions for displaying different types of information and controls within the HMI. One or more main "overview" screens may be accessible by the user at all times. This may avoid poor navigation patterns exhibited by certain prior art systems and may improve the efficiency of the user's HMI session. In the embodiment shown, the interface architecture comprises a navigation zone 202, a system header zone 204, and a canvas zone 206. Navigation zone 202 may comprise one or more selectable icons corresponding to various user options. These user options may correspond to the selectable options described in step 120. System header zone 204 may provide the user with a high-level status of the system, a status of alarms, a title of the current screen, and date & time information. Canvas zone 206 may provide the user with system information and controls. Canvas zone 206 may comprise the one or more selectable components and/or processes described in step 140. In some embodiments, certain sub-portions of canvas zone 206 may be assigned to display certain components and/or processes.

Figure 3A:
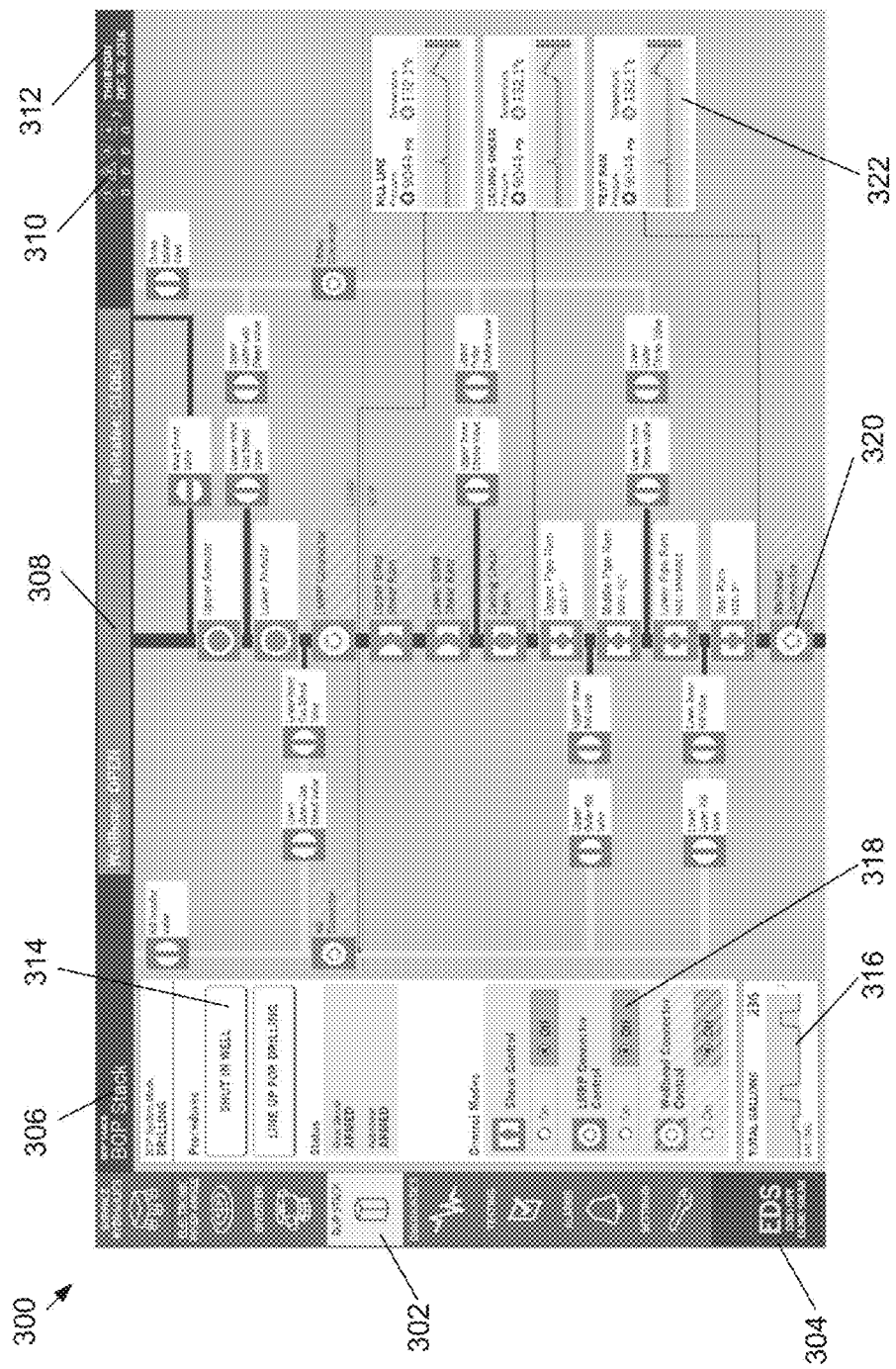
FIG. 3A shows an embodiment of an exemplary GUI display exhibiting the three zones of the screen architecture shown in FIG. 2 as applied to a blow-out preventer (BOP) Stack option according to an embodiment of the HMI system.

FIG. 3A shows an embodiment of an exemplary GUI display 300 exhibiting the three zones of the screen architecture shown in FIG. 2 as applied to a blow-out preventer (BOP) Stack option. In the embodiment shown, navigation zone 202 comprises system navigation icons 302 that may always be present to enable users to quickly change from one section of the system to another. In some embodiments, system navigation icons 302 may correspond to the selectable options described in step 120. When a user selects one of user navigation icons 302, the icon may be highlighted to inform the user of the display being actively viewed. In the embodiment shown, the bottom left corner of navigation zone 202 comprises button 304 that may begin an Emergency Disconnect Sequence (EDS). This sequence may be an option that disconnects certain physical elements of the oil rig in the event of certain emergencies. EDS button 304 may be located away from the most used controls of the system, but in a consistent, always-present location for quick access under duress.

In the embodiment shown, screen title 306 may be displayed in system header zone 204 to help identify what screen the user is viewing. It may also display a breadcrumb trail to assist the user in determining his current system level. In the embodiment shown, system header zone 204 may contain a system status section 308 that may include an indication of whether the wellbore of the oil rig is open or closed, whether the system is fully functional, whether failsafes are open or closed, and whether there are any active alarms. System status section 308 may always be displayed in system header zone 204 so that any user can get the high-level status of the BOP control system at a glance. In some embodiments, color, pattern, and large text can help users easily make an assessment of the BOP status, which may be important to maintain safety during operation of the oil rig. In some embodiments, system header zone 204 may comprise an alarm status section 310 that consistently display any uncleared alarms so that the user can assess if there are events that need to be addressed. A time and date section 312 may be displayed consistently in system header zone 204.

In the embodiment shown, a left sidebar of canvas zone 206 is where procedure controls and access controls may be located. In the embodiment shown, process control icon 314 may correspond to a selectable process described in step 140. In some embodiments, the left sidebar of canvas zone 206 may also display processing capacity information 316 and destructive function control icons 318. Capacity information 316 may inform the user of the current processing capacity of the oil rig. Destructive function control icons 318 may comprise safety features that keep certain destructive function control modes in a default "off" status to prevent a user from accidentally performing a destructive function. Destructive functions may be functions that cut pipe, disconnect parts of the BOP stack, or could otherwise cause major delays in the functioning of the oil rig if functioned accidentally. In order to perform a destructive function, the user must consciously activate the destructive function by selecting one of destructive function control icons 318 before performing the destructive function. A main, central zone of canvas zone 206 is where information—values, configurations, status, physical components, etc.—may be displayed. In the embodiment shown, a layout of one or more component icons 320 may enable the user to view current rig operating status. In the embodiment shown, component icon 320 may correspond to a selectable component described in step 140. Various colors, symbols, and metadata may be used to inform the user of the current state of various rig components. A right sidebar of canvas zone 206 may comprise controls for the functioning of the system and/or visual status displays 322 for certain components. In the embodiment shown, visual status displays may inform the user of current pressure and temperature of certain components. Upon a user selection of process control icon 314 or component icon 320, details about the selected process or component are displayed in the right sidebar of canvas zone 206. In some embodiments, the only place in the HMI where the user can cause an actual function of a component or process is in this right sidebar. By displaying different types of functions in preassigned areas of canvas zone 206, the mental strain on the user may be decreased. Further, by requiring that destructive functions be activated in one zone before being selectable in another zone, accidental activation of destructive functions may be drastically reduced and/or eliminated.

In some embodiments, the HMI for the BOP control system revolves around the BOP Stack screen, which may be accessed upon a user selection of the corresponding system navigation icon 302. This may be considered the home screen for user, where they may start and end many key operation tasks. To enable the majority of important BOP tasks to be completed from this screen, the HMI may comprise a number of key interaction principles. In some embodiments, the design may utilize a color palette that may easily inform a user of current operating conditions and may allow for improved situational awareness. In some embodiments, functioning a component in a consistent, predictable way may be key to preventing errors (thereby reducing related downtime) and maximizing user efficiency. In some embodiments, important structural oil rig elements such as shears and connectors are disabled by default. The user must take a deliberate step of activating destructive functions for these components which may prevent accidental operation. Certain preset procedures (e.g., automatically closing the diverter, or lining up the BOP for drilling) may reduce repetitive tasks for users without removing user control and oversight. In some embodiments, certain functions that may require a two-handed operation by regulation for safety considerations. In some embodiments, the safety features provided by a traditional two-handed operation may be realized in other, more efficient ways.

As discussed above, the design of some embodiments may utilize a color palette that allows for improved situational awareness. In some embodiments, elements colored green may indicate normal component states representing normal and error-free functioning or drilling conditions, and elements colored red may indicate abnormal component states representing problems, alarms, and errors. By only having color represent these two basic states, this design may reduce the cognitive load or amount of mental effort that users expend as they utilize the system. When cognitive load is low, performance time and errors may decrease while the probability of successfully accomplishing a goal may be increased. In this way, users may be able to easily interpret essential elements in the interface to quickly understand and respond to any situation. For example, system status section 308 may be colored green when the wellbore is open and ready to function but may be colored red when the wellbore is closed. Similarly, component 320 may be colored green when that component is functioning normally but colored red when that component is functioning abnormally or in an alarm state. In some embodiments, green and red may not be displayed simultaneously. If the system is functioning in a normal state, all elements will be colored green. If any element of the system is functioning abnormally, the malfunctioning component and system status section 308 may be colored red.

Figure 3B:
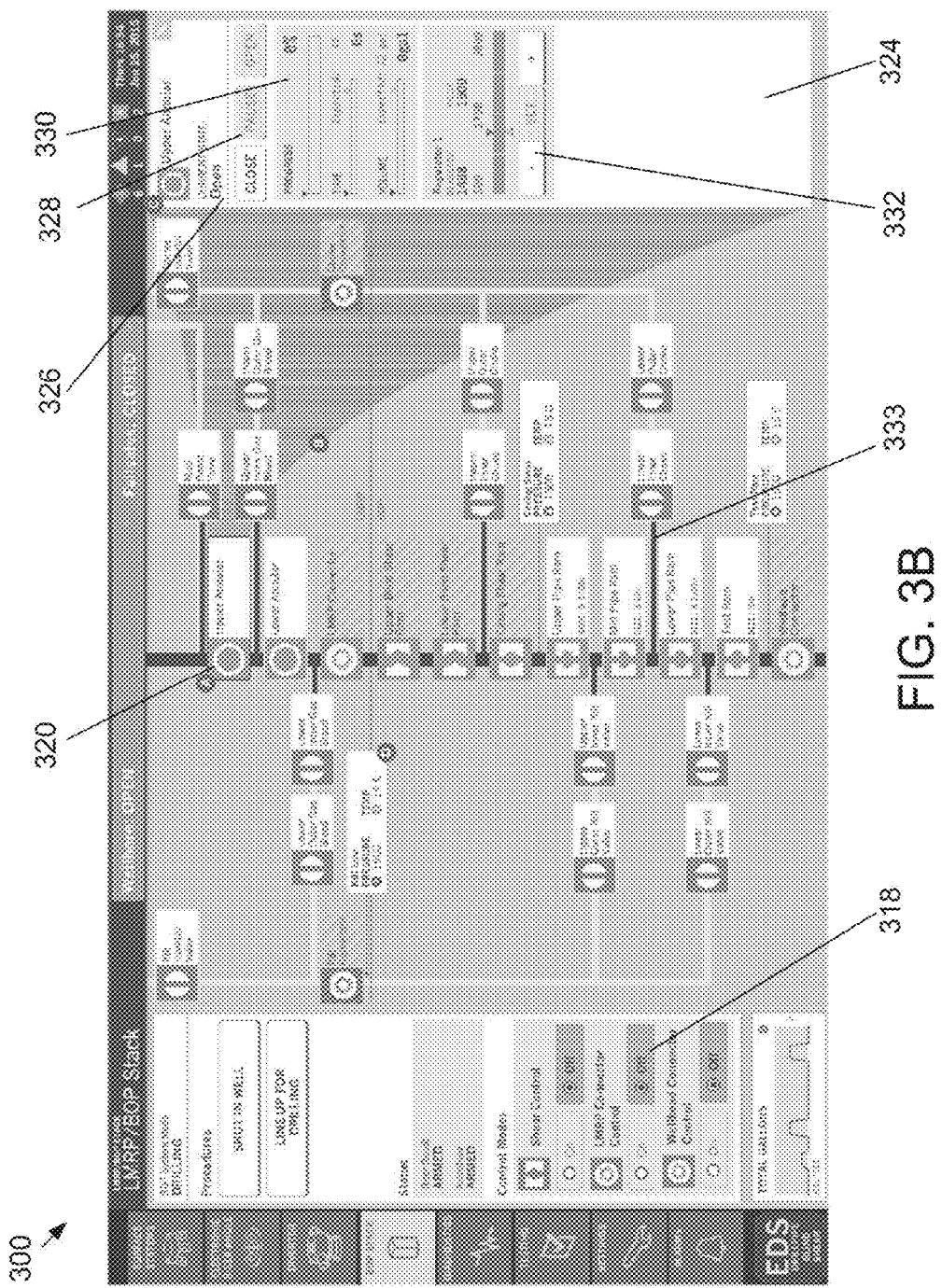
FIG. 3B shows an embodiment of an exemplary GUI display when a component option is selected according to an embodiment of the HMI system.

FIG. 3B shows an embodiment of an exemplary GUI display 300 when a component icon 320 is selected. Upon a user selection of a component icon, control options field 324 for that component may be displayed in the right sidebar of canvas zone 206. In the embodiment shown, the control options within control options field 324 may correspond to action options described in step 160. In some embodiments, a selected component icon 320 may be outlined in a particular color to inform the user that a component is selected. In some embodiments, the border of a selected component may be blue, and the label may comprise bold blue text. In some prior art systems, there is a common problem where the state of a component may be represented by a button. However, this button may also be the control to change that component's state, which can lead to user confusion. In some embodiments, labels and actions may be treated visually differently and the state of a component is not depicted by the button that is also meant to change its state. When the user selects a component 320, control options field 324 may open on the right sidebar of canvas zone 206. A blue stripe pattern may be displayed to draw a direct connection between the selected component 320 and its control options field 324 on the right. Pressure/temperature visual status displays 322 may be repositioned within canvas zone 206 when a control options field 324 is opened. A state for a selected component 320 may be clearly labeled in a component state field 326, which may be in close proximity to the available component functions in component options field 324. The available functions may be presented in a common order and layout. For example, action state options 328 (e.g., Close, Pause, and Open) may always be listed left to right, regardless of the component, current state, or default state. Available action state options 328 may have a certain color and may be selectable while unavailable action options may be have a different color and/or a pattern. In some embodiments, unavailable action options may be a gray color and/or may have a diagonal line pattern. In some embodiments, control options field 324 may contain one or more action status fields 330 and component action options 332. Action status fields 330 may inform the user of the progress of certain actions while component action options 332 may enable the user to perform various functions of the selected component 320. Action status fields 330 may contain contextual data (e.g., progress, gallons, time, pressure) relevant to the selected component 320. In some embodiments, when a particular function is selected by the user, an icon in the action status field 330 may animate to indicate the current action and show current progress of the function. The contextual data may also update in real-time. When the function is complete, the component state field 326 may update to reflect a modified state and progress bars in action status fields 330 may display the modified contextual data.

Before functioning destructive components like shears and connectors, the user may need to activate the access control for that type of component by selecting one or more of destructive function control icons 318. For a destructive component like a shear or a connector—i.e., any component that has an initial access control—there may also be a two-part confirmation displayed in control options field 324 before enabling the destructive function. In some embodiments, the two-part confirmation comprises the selection of a checkbox and a selection of a function activation button.

The use of destructive function control icons 318 may be a safety and error-prevention measure. Destructive function components, such as shears and connectors, may be disabled in a default state. Activating these destructive components may add a deliberate step that makes accidental operation less likely. In some embodiments, certain components may not be available to be activated during certain system modes. For example, when the HMI system is in a drilling mode, a wellhead connector component may be unable to be accessed. When the HMI system is in Run/Pull Mode, a riser connector component may be unable to be accessed. In some embodiments, when the user activates one or more of destructive function control icons 318, the icons may be colored red to signal to the user that the activation of these destructive components may need special attention.

Figure 4A:
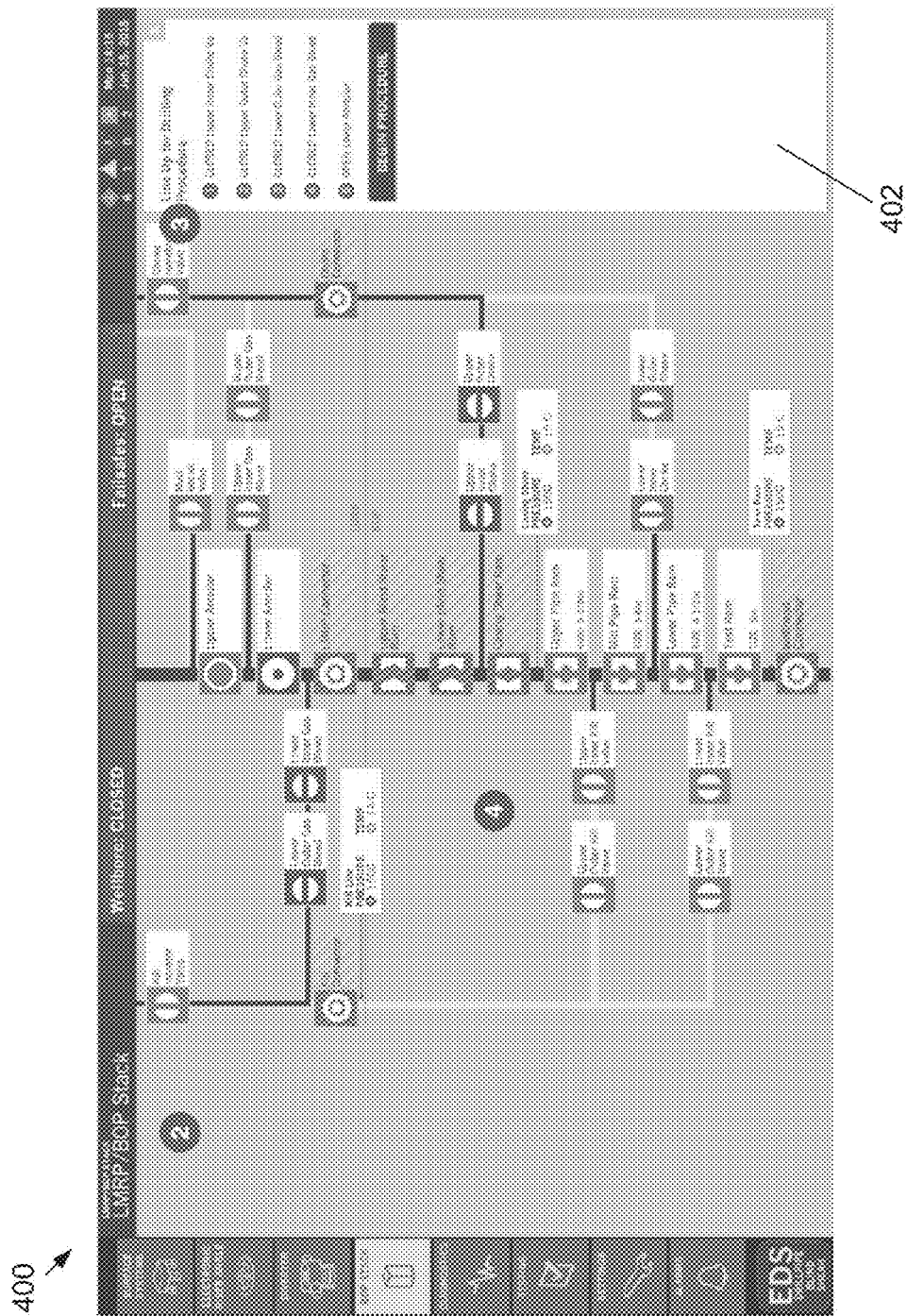
FIGS. 4A-4B shows an embodiment of an exemplary GUI display when a process control option is selected according to an embodiment of the HMI system.
Figure 4B:
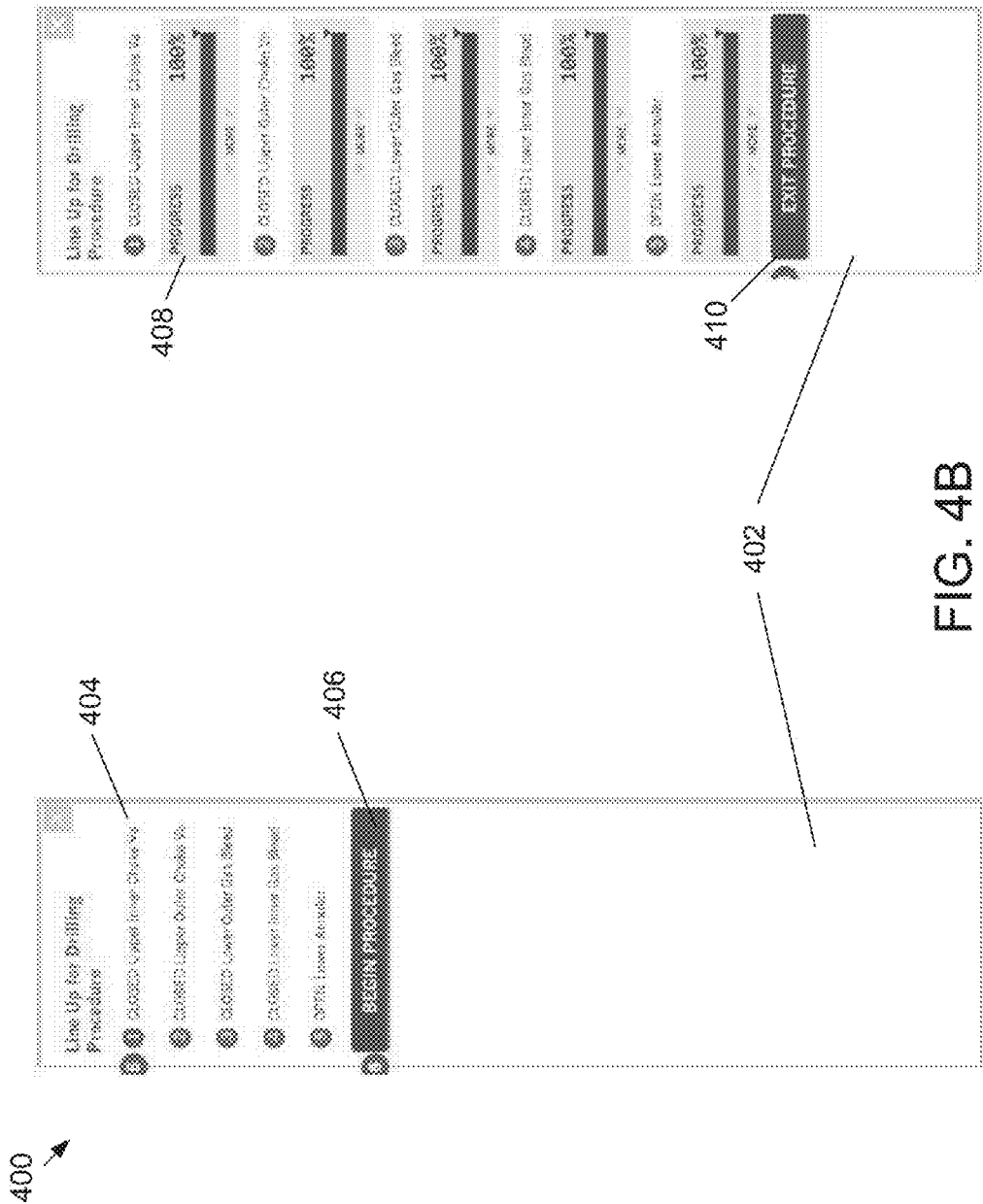

FIGS. 4A-4B show an embodiment of an exemplary GUI display 400 when a process control icon 314 is selected.

Procedures (like automatically closing the diverter, or lining up the BOP for drilling) are meant to reduce repetitive tasks for users without taking control and oversight away. Depending on the procedure, the procedures require varying levels of user interaction. In some embodiments, process control options field 402 may be displayed in the right sidebar of canvas zone 206 when a user selects a process control icon 314. For some processes, a checklist for pre-function optional confirmation items may be displayed in process control options field 402. These may comprise helpful reminders for tasks outside of the BOP system's control. A checklist for required pre-function confirmation items may also be displayed. In these instances, the user must select a checkbox as a precaution before starting the sequence or procedure. In instances where there may be multiple ways to run the procedure, this option may be presented for the user to select. In some embodiments, a preselected option may be configurable in user settings. By providing checklists for required and recommended confirmation items and introducing a checkbox precaution step, the disclosed embodiments may reduce operator error and increase safety and operator confidence.

As shown in FIG. 4B, component function steps 404 may be listed within process control options field 402 in the order in which they may be functioned. This order may be predetermined by configurable procedure settings. The user may activate the procedure by selecting process activation button 406. As the steps in the list are completed, one or more live progress indicators 408 corresponding to each step may display current progress of the procedure. In some embodiments, progress indicators 408 may be expandable to display additional details about a particular step (e.g., gallon count or pressure.). After all steps of the procedure are complete, the user may exit the procedure by selecting process end button 410.

Referring back to the embodiment shown in FIG. 3A, a BOP Stack screen may comprise a graphical representation or layout of a lower marine riser package (LMRP) and a BOP. It may include components 320 such as rams, annulars, choke and kill valves, connectors, pressure indicators, and a total gallon count. When operating the BOP, the system may present options for manual control, as well as common operational procedures 314 that can be pre-programmed and guide the user through the proper steps. Additionally, this screen may comprise access control modes for destructive components 318 such as shears and connectors—components that if functioned errantly would lead to BOP downtime. Available pressure and temperature sensor values 322 may be displayed in the canvas zone 206 if there is no control panel present.

In some embodiments, when the system is in a drilling mode, only certain destructive functions 318 such as, for example, Shear Control and LMRP Connector Control can be operable—Wellhead Connector Control may be disabled in this mode. Conversely, when the system is in a run/pull mode, LMRP Connector Control may not be operable. The user may select capacity information 316 to open controls for resetting a count and viewing a detailed log of fluid usage. In the embodiment shown, components 320 that are on the wellbore and affect the ability to drill are displayed in a green color. This may provide an easy, at a glance (or across the room) view of whether or not the wellbore is open. In certain modes, some components 320 may be disabled. Disabled components may show their state through color and icon just like enabled components. Both enabled and disabled components may have metadata or labels that identify the components. These labels may be visible both when the components are enabled and disabled. In some embodiments, failsafe components and valve components may be colored gray instead of green unless they are in an abnormal or unexpected position. In these abnormal cases, the component icon would be colored red.

Referring back to the embodiment shown in FIG. 3B, action status fields 330 may be based on one or more algorithms that takes time, volume, and pressure into account. Knowing these three expected values, the system may estimate progress—and use those three values to indicate when a component does not function as expected. Expected values may be defined at a configuration stage, and action status fields 330 may show current and expected values. The right-hand end of the progress bar may represent the limit of whether or not the value may trigger an alarm. In the case of a leak, certain action status fields 330 may move all the way to the right of the progress bar, and the value's text readout may continue to count. The appropriate alarm may also be displayed in control options field 324 (along with other alarm display points) when values move outside acceptable ranges.

To provide feedback when disabled components or controls are selected, the HMI may use a standard visual pattern. This pattern is designed to give feedback to verify that the system received an input from the user and indicate how a user may enable a component. For example, if a user selects a disabled component, the component icon may blink a transparent white color and receive a border. At the same time as the component is selected, controls related to the selected disabled component may also blink with the same visual indicators discussed above. After the initial blink, the white fill and gray border may fade out over a one second interval. The control indicator may fade out at the same rate as the component indicator until the component returns to its previous appearance.

In some embodiments, the HMI may predict the presence of fluid and/or pressure in the wellbore by using a highlighted flowpath 333. In some embodiments, flowpaths where the user can expect fluid to be flowing may be highlighted in a blue color. In the event where pressure may possibly build up in the wellbore, that section of the wellbore may be highlighted with an alternate color such as magenta. The main flow of fluid may be highlighted blue to show where the fluid has a high probability of flowing. Anywhere that fluid can also be flowing in the kill or choke lines may be highlighted with a blue color. These highlighted flowpaths 333 may enable the user to quickly see where fluid will likely flow and where fluid pressure may likely build up.

In some embodiments, a "normal" state of the BOP may be defined when it is initially configured. If components 320 are not in their predefined normal states, a Line-Up procedure can be used to automatically put them into the right state. This Line-Up procedure may comprise one of process control icons 314. The Line-Up procedure may combine an awareness of the system's state, decide what components to function, and manually function multiple components into one automated procedure. Referring back to the embodiments shown in FIG. 4A, upon beginning a procedure, information for the selected procedure may be displayed in the process control options field 402. Components 320 may not be selectable while a procedure is running, which may be defined by any time that process control options field 402 is present. The components to be functioned are determined dynamically based on current state and desired state. Pressing process activation button 406 may start performing the steps 404 of the procedure. As component functions are completed, their progress indicators 408 show 100%, and the current function's status may be expanded to display the progress indicator. Upon completion, pressing process end button 410 may close the process control options field 402 and re-enable individual component 320. At any point during or after the procedure, the individual step progress indicators 408 may be expanded to show more detailed information (e.g., time, gallon count, and regulator pressure).

In some embodiments, a sequence of actions to shut in the well may also be designed as a procedure in the HMI. As a procedure, it ensures that a policy can be implemented uniformly among different oil rigs and followed properly by users. This Shut-In Well procedure may comprise one of process control icons 314. The Shut-In Well procedure may have a handful of optional items to help the user remember his training in a time of distress. Optional items are items that will not slow down the time-sensitive act of shutting the well. An important step that may be initially included in the Shut-In Well procedure may be the closing of one of the annulars. This can be configured at deployment. Pressing process activation button 406 may immediately start functioning the selected annular. As the annular closes, progress may displayed by progress indicators 408 and more detailed information can be found by expanding the progress module. This detailed information may enable the user to verify the time, pressure, and gallon count. After the annular has closed, the user may have two options: 1) the user may view optional steps, which can be configured to include other components such as opening the choke valves to begin to manage the kick, and 2) exit the procedure in order to deal with other concerns or systems. For each optional step, there may be additional prompts for the user to select a certain function rather than automatically firing multiple functions. If the user decides to view the optional steps, the procedure may be exited after all optional steps are executed or considered.

In some embodiments, the control system may automatically monitor all fluid used in functioning BOP components. There may be automatic counts for each function that may be displayed in the component options field 324 for each component, but there may also be a total gallon count that may show the overall gallon count for all components. This total gallon count may be shown in capacity information 316. The BOP Stack screen may display this overall gallon count and may also allow the user to reset it to zero. This may be useful to users when monitoring flow for purpose of both complying with regulations and verifying proper component functionality. The gallon counter may visually be treated like a component, as an affordance that it will open up its own component options field 324 on the right hand side of the screen. The only control available for the gallon count may be a Reset Gallon Count button. A small trend line may be shown for a default past period of time with the option to view past values in more detail.

In some embodiments, the HMI may provide audible feedback to a user upon a user selection of one or more functions. For example, the BOP Stack screen may enable the user to actuate various functions on the BOP. These functions may control components such as upper pipe rams, lower pipe rams, annulars, and the like. Upon a user selection of a particular function, the audible feedback system may provide an audible confirmation of the selected function to the user. For example, if a user selects the upper pipe rams, an audible confirmation may be issued to the user confirming that the upper pipe rams are selected. In some instances, a user may be careless in the selection and may select an undesired function. In these cases, the audible confirmation may alert the user to the incorrect selection and allow the user to make the correct selection before the function is initiated. In the example above, the user may have mistakenly selected the upper pipe rams instead of the lower pipe rams. When the user receives the audible confirmation, the user may realize that he selected an undesired function. The user may then go back and select the lower pipe rams and receive an audible confirmation before any functions are initiated. Therefore, the audible feedback system may provide another safety element that may alert a user to possible carelessness and mitigate damage that may otherwise be caused to the BOP due to accidental function initiation.

Figure 5:
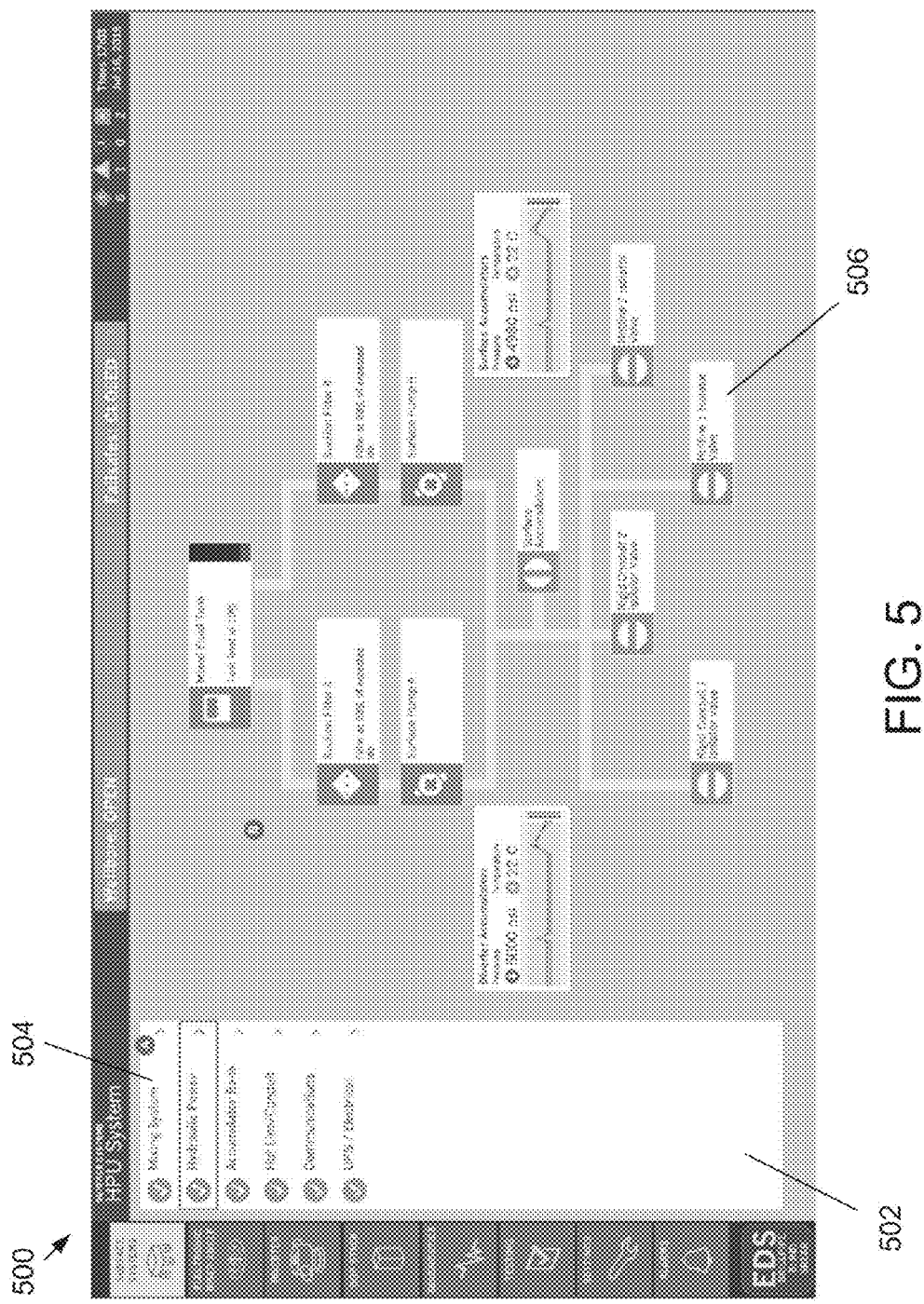
FIG. 5 shows an embodiment of an exemplary GUI display when a user selects a Surface Systems option according to an embodiment of the HMI system.

FIG. 5 shows an embodiment of an exemplary GUI display 500 when a user selects a Surface Systems option. In the embodiment shown, state option field 502 may comprise one or more surface system component option icons 504 that may give the user access to the current state of various surface system components. These surface system components may include a Fluid Mixing Unit, a Hydraulic Power Unit, a Hotline & Conduit Valve Package (HLCVP), and a band of Surface Accumulators. Graphic representations of those systems may be used when appropriate. Upon selection of a surface system component option icon 504, the component status information may be displayed in a central portion of canvas zone 206. In some embodiments, a representative depiction 506 of the selected system may be displayed, including components and sensors that can be monitored and controlled.

In some embodiments, the Hydraulic Power Unit, in conjunction with the Surface Accumulator Bank, may be responsible for supplying pressurized hydraulic flow to on-stack common rails through rigid conduits and hotlines. The Fluid Mixing Unit may store additive concentrate and glycol and deliver metered additive concentrate, glycol, and potable water to a Hydraulic Power Unit reservoir tank. The Surface Accumulator Bank may be responsible for stored hydraulic energy for nominal operations of the BOP. The Hotline and Conduit Valve Package (HLCVP) may be responsible for providing fluid filtration subsea, diagnosing fluid quality, providing a means to isolate and flush rigid conduits and hotlines, and connecting surface pressure sources to common rails.

Figure 6:
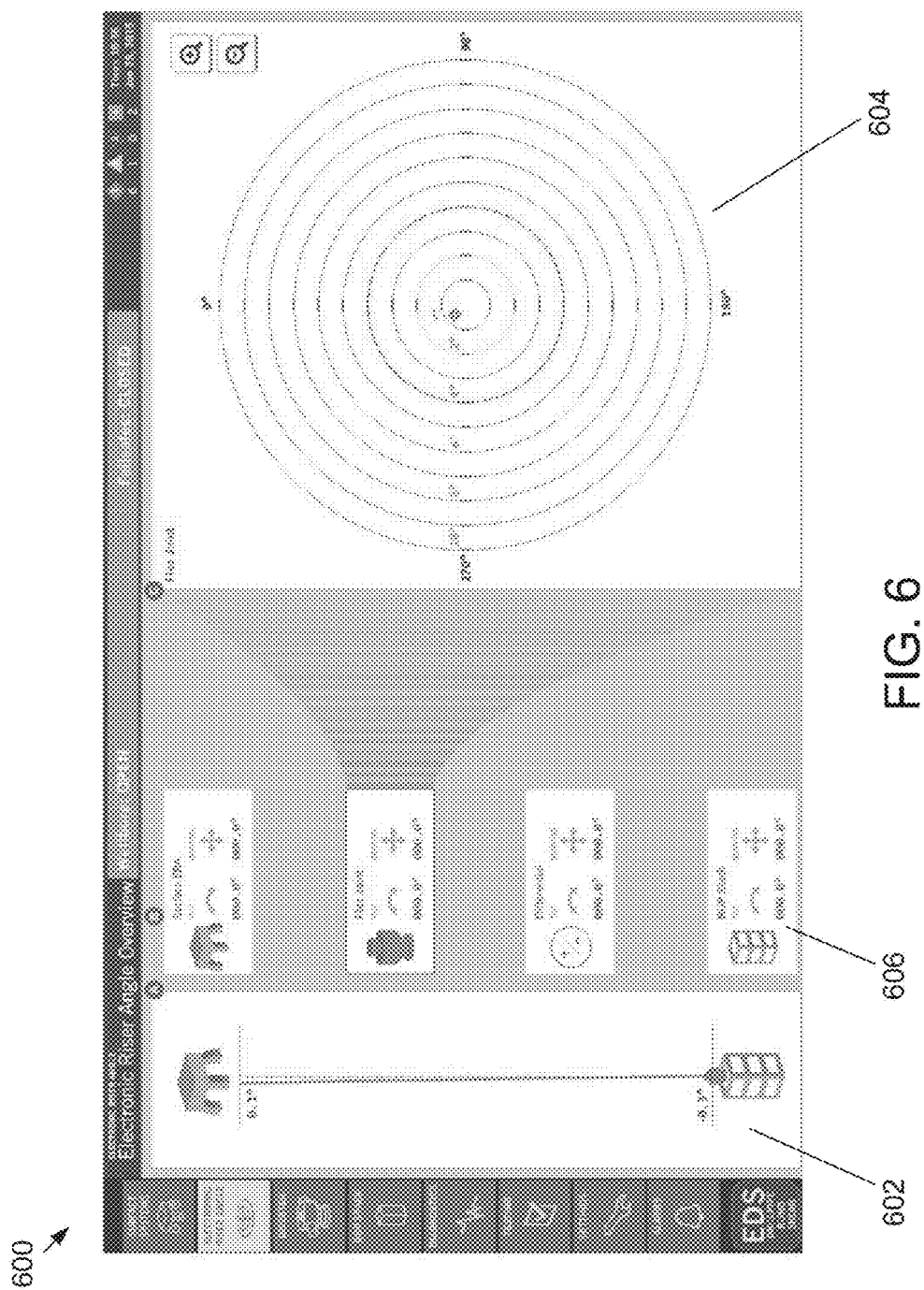
FIG. 6 shows an embodiment of an exemplary GUI display when a user selects an Electronic Riser Angle option according to an embodiment of the HMI system.

FIG. 6 shows an embodiment of an exemplary GUI display 600 when a user selects an Electronic Riser Angle option. These screens may display information about the position and angle of the BOP and riser. This information may be visualized on an X-Y graph as well as a tabular format. In the embodiment shown, a vertical overview 602 of the riser angle may be displayed on a left side of canvas zone 206. A top-down visual summary graph 604 of the riser angle information may be displayed on a right side of canvas zone 206. In the embodiment shown, a user can select one or more of a plurality of viewing option icons 606 to view the angle information in top-down visual summary graph 604.

Figure 7:
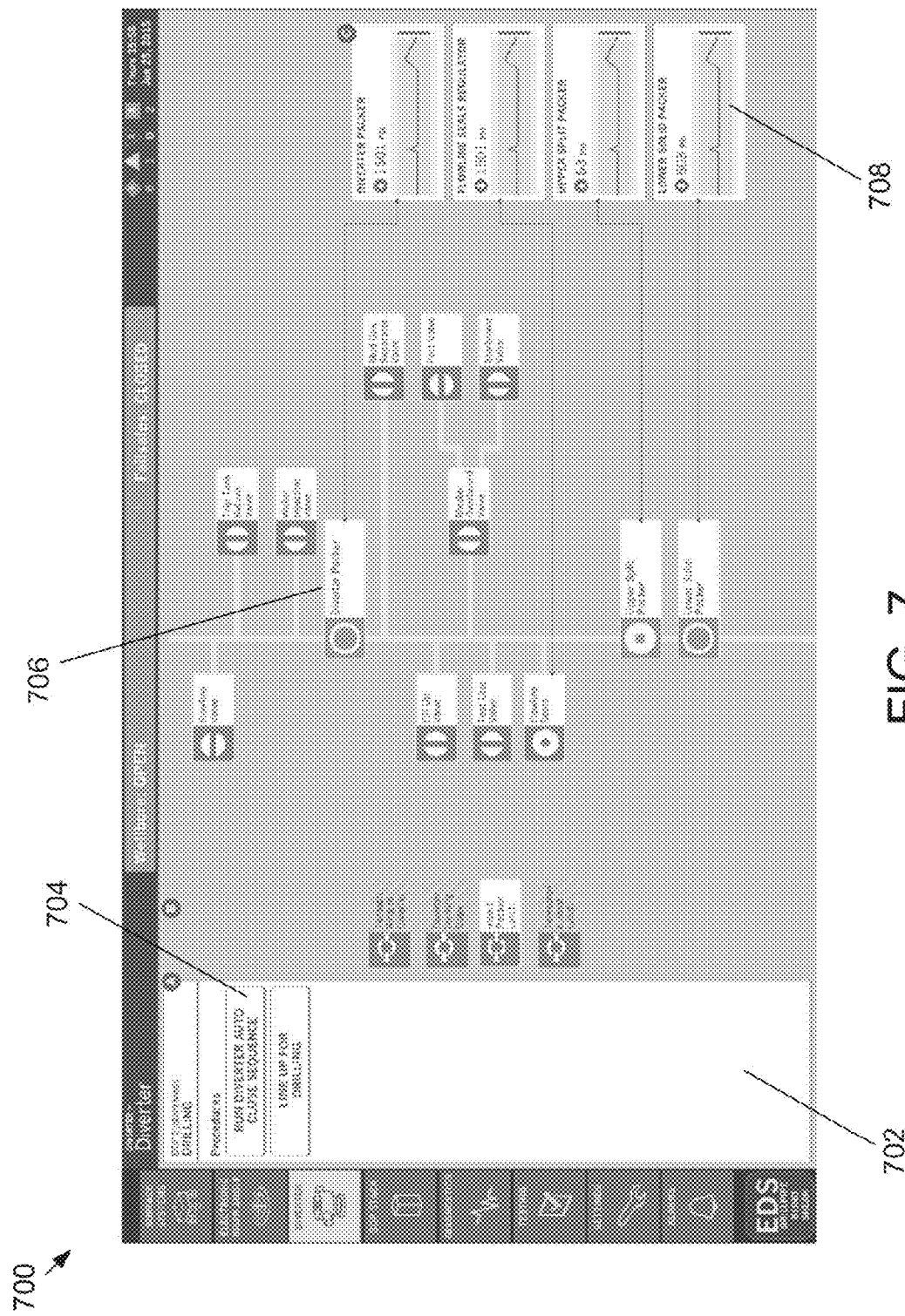
FIG. 7 shows an embodiment of an exemplary GUI display when a user selects a Diverter option according to an embodiment of the HMI system.

FIG. 7 shows an embodiment of an exemplary GUI display 700 when a user selects a Diverter option. This option may show the state of several valves, regulators, and other devices related to a diverter and may also facilitate changing pressures. This option may need to be configurable as each rig may have a different diverter setup and components. In the embodiment shown, process option field 702 may comprise one or more process option icons 704 that may give the user quick access to one or more automated and guided procedures such as a Diverter Close sequence and a Line Up for Drilling sequence. In some embodiments, a representative depiction 706 of the diverter system may be displayed to give the user an overview of the state of the riser and the state of key connection components. The components may be organized by how they are physically connected. One or more dog components may be shown separately from the diverter system depiction in the left side of canvas zone 206. In some embodiments, pressure/temperature visual status displays 708 may be available to enable the user to monitor pressure and temperature readings for various components.

Similar to the embodiments discussed above, the user may select a component from representative depiction 706 to open a component control field (not shown but similar to component options field 324) on the right side of canvas zone 206. The component control field may comprise elements similar to component state field 326, available action state options 328, one or more action status fields 330, and component action options 332, as shown in FIG. 3B. The user may initiate an operation by selecting one or more action state options 328. The various components representative depiction 706 may have differing states for display in component state field 326. For example, valves may have open and closed states, packers may have energized and de-energized states, and dogs may have latched and unlatched states. Action status fields 330 may comprise progress indicators that may show current and expected values. Associated regulator elements may also be controlled from the component control field.

In the embodiment shown, diverter procedures and sequences corresponding to process option icons 704 may be programmed, presented, and operated similar to the embodiments shown in FIGS. 3A-B. A Diverter Auto Close Sequence or a Line Up for Drilling Sequence may be activated by the user selecting the corresponding process option icon 704. In these instances, the control system may evaluate the state of each affected component and produce a sequence of control events (e.g., open, close, latch, energize) that hydraulically optimizes the efficiency of the system reaching the new state. For the Diverter Auto Close Sequence procedure, the components may go to these states when the sequence is initiated: Diverter Locking Dogs EXTEND, Flow Line Seals ENERGIZE, Master Overboard Vent Valve OPEN, Port (or Starboard) Vent Overboard Valve OPEN, Flow Line Valve CLOSE, Trip Tank Return Valve CLOSE, Lower Solid Packer ENERGIZE, Diverter Packer CLOSE. For the Line Up Diverter for Drilling procedure, the components may go to these states when the sequence is initiated: Flow Line Valve OPEN/CLOSED depending on whether the driller lines up on the Flow Line or Trip Tank Return Line, Fill Up Valve CLOSED, Test Line Valve CLOSED, Trip Tank Return Valve OPEN/CLOSED depending on whether the driller lines up on the Flow Line or Trip Tank Return Line, Water Injection Valve CLOSED, Diverter Packer OPEN, Diverter Locking Dogs EXTENDED, Insert Packer Locking Dogs EXTENDED, Master Overboard Valve CLOSED, Mud Gas Separator Valve CLOSED, Tension Ring to Diverter Housing Dogs EXTENDED, Telescopic Joint Latch Dogs EXTENDED. The user may activate the selected sequence to initiate the steps in the procedure to occur automatically. While the sequence is being performed, the user may have the ability to see additional details for gallon count, pressure, and elapsed time for each step of the procedure.

Figure 8A:
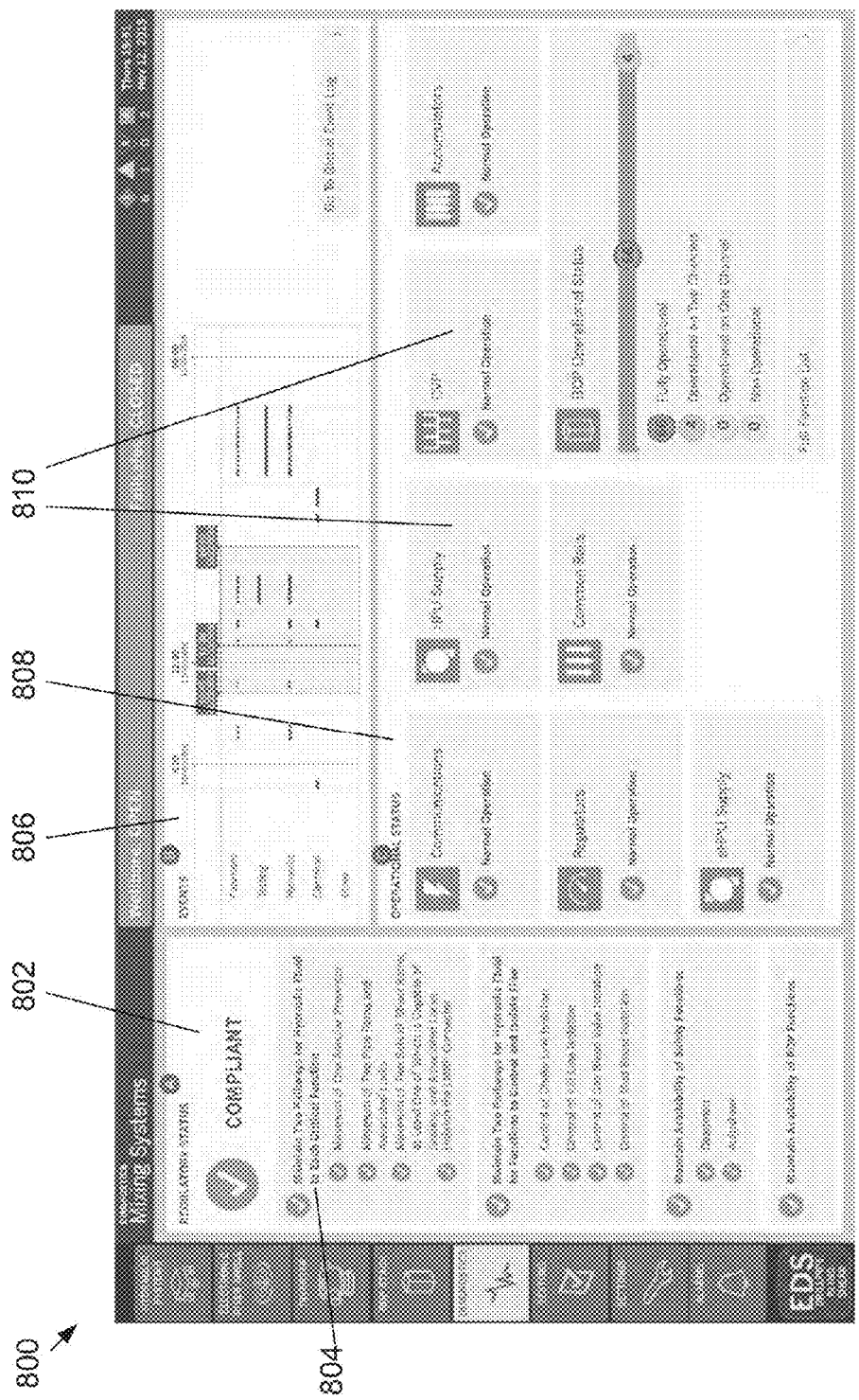
FIG. 8A shows an embodiment of an exemplary GUI display when a user selects a Diagnostics option.

FIG. 8A shows an embodiment of an exemplary GUI display 800 when a user selects a Diagnostics option. In the embodiment shown, the Diagnostics screen may present information about alarms, events, and other indicators that may impact the readiness of the BOP. The Diagnostics screen may also present an overview of the BOP's readiness and state of compliance with regulatory standards. In the embodiment shown, a regulatory status panel 802 may list one or more primary compliance regulations 804 that must be verified in order to safely secure the well. In the embodiment shown, if any of the regulations 804 listed become untrue or unavailable, then the system may be considered out of compliance with regulatory standards. In some embodiments, the well may be shut down until diagnosis and correction of the non-compliant function or component may be performed. In the embodiment shown, a user may select a primary compliance regulation 804 to navigate to a BOP function detail screen for a function that is causing the system to be out of compliance. In some embodiments, if the system is out of compliance, clicking anywhere within regulatory status panel 802 may automatically take the user to the first function that is causing the system to be out of compliance. In some embodiments, if the system is not out of compliance, clicking anywhere within regulatory status panel 802 may automatically take the user to the first function listed in the panel. In the embodiment shown, an events overview panel 806 may display a chronological view of the most recent events both initiated by and received by the control system. In some embodiments, clicking anywhere within the events overview panel 806 may take the user to one or more event log screens. In the embodiment shown, an operational status field 808 may provide a summary of the operational readiness of various subsystems 810 of the control system. In some embodiments, clicking on one of the individual subsystems 810 in this field may enable a user to navigate to a diagnostic summary screen for the selected subsystem.

Figure 8B:
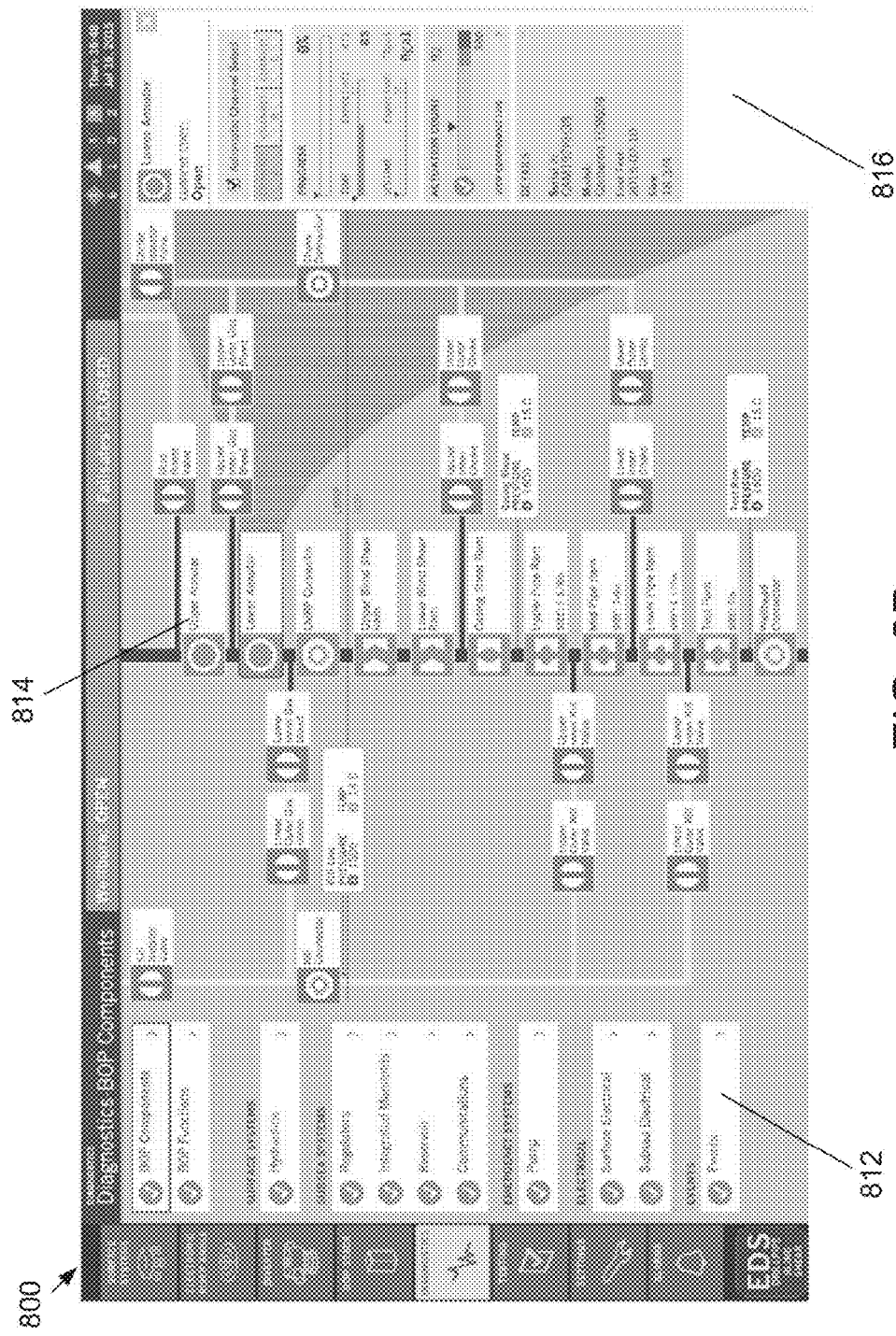
FIG. 8B shows an embodiment of an exemplary GUI display when a user selects a BOP Components option within the Diagnostics option according to an embodiment of the HMI system.

FIG. 8B shows an embodiment of an exemplary GUI display 800 when a user selects a BOP Components option within the Diagnostics option. The display 800 shown in FIG. 8B may be displayed upon a user selection of a subsystem 810 from operational status field 808 shown in FIG. 8A. In the embodiment shown, one or more display category option icons 812 may be selected. In some embodiments, a BOP Component Information screen may be displayed as a default screen or upon a user selection of the corresponding category option icon 812. Selecting a component 814 from the BOP Component Information screen may bring up detailed diagnostic information about the selected component in component options field 816. However, in the embodiment shown, the options contained in component options field 816 are disabled and component 814 cannot be functioned from this screen. The Diagnostics option may fulfill several key system requirements. For example, the system may keep a count and be able to display the number of times a device is operated (e.g., opened or closed). The system may also track maintenance data on each part of the BOP. Information tracked might include but might not be limited to install date, part number, last checked date, and number of operations. The system may also indicate when components are reaching mean failure times or when the number of operations approaches or exceeds recommended numbers. In addition, the Diagnostics option may be accessible based on user role. For example, some users may have greater diagnostic access privileges than other users.

Figure 8C:
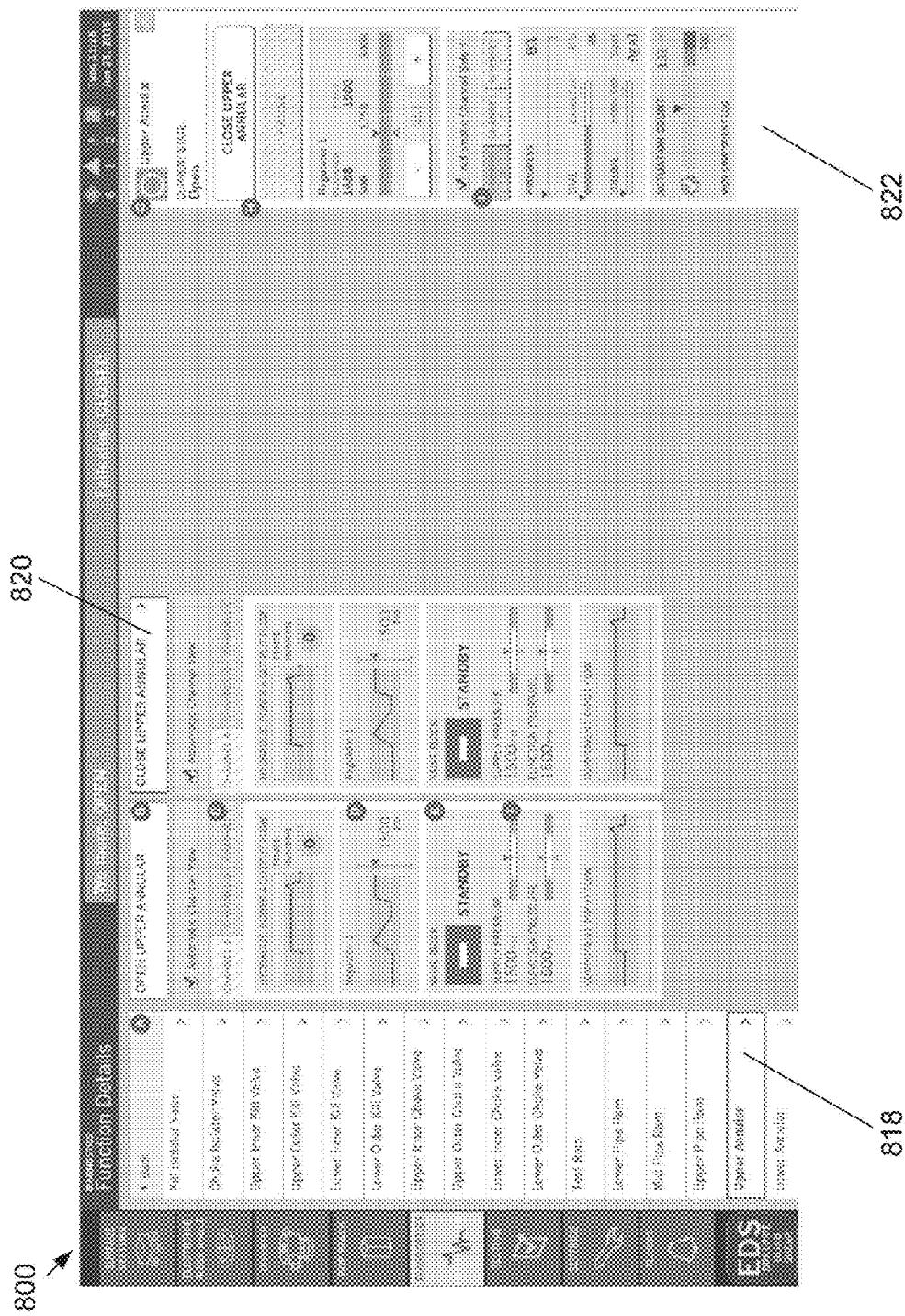
FIG. 8C shows an embodiment of an exemplary GUI display when a user selects a BOP Functions option within the Diagnostics option according to an embodiment of the HMI system.

FIG. 8C shows an embodiment of an exemplary GUI display 800 when a user selects a BOP Functions option within the Diagnostics option. In some embodiments, the BOP Function Details screens will show the operating path to specific BOP components. In the embodiment shown, one or more component option icons 808 may be selected. Upon selection of a component option icon 818 by the user, one or more component function fields 820 may be displayed in canvas zone 206 corresponding to functions available for the selected component. Component function fields 820 may comprise one or more diagnostic displays. For example, a channel control may allow the user to view diagnostic information for an active channel or allow the user to manually view any of the channels. A regulator pressure may be displayed as both the instantaneous value and the running trend. An Integrated Manifold may be represented as a functional valve block. In some embodiments, the state of the valves may be displayed as an overall state of either Standby, Actuating, or Venting. A flow volume and/or rate may be displayed as a graphical trend. Component control field 822 may comprise controls for activating the component function for the selected component function field 820. The user may select various options within component control field 822 to activate various aspects of the selected component function. For example, the user may choose a particular hydraulic source system to operate the function or choose a particular channel of the integrated manifold to operate.

Figure 8D:
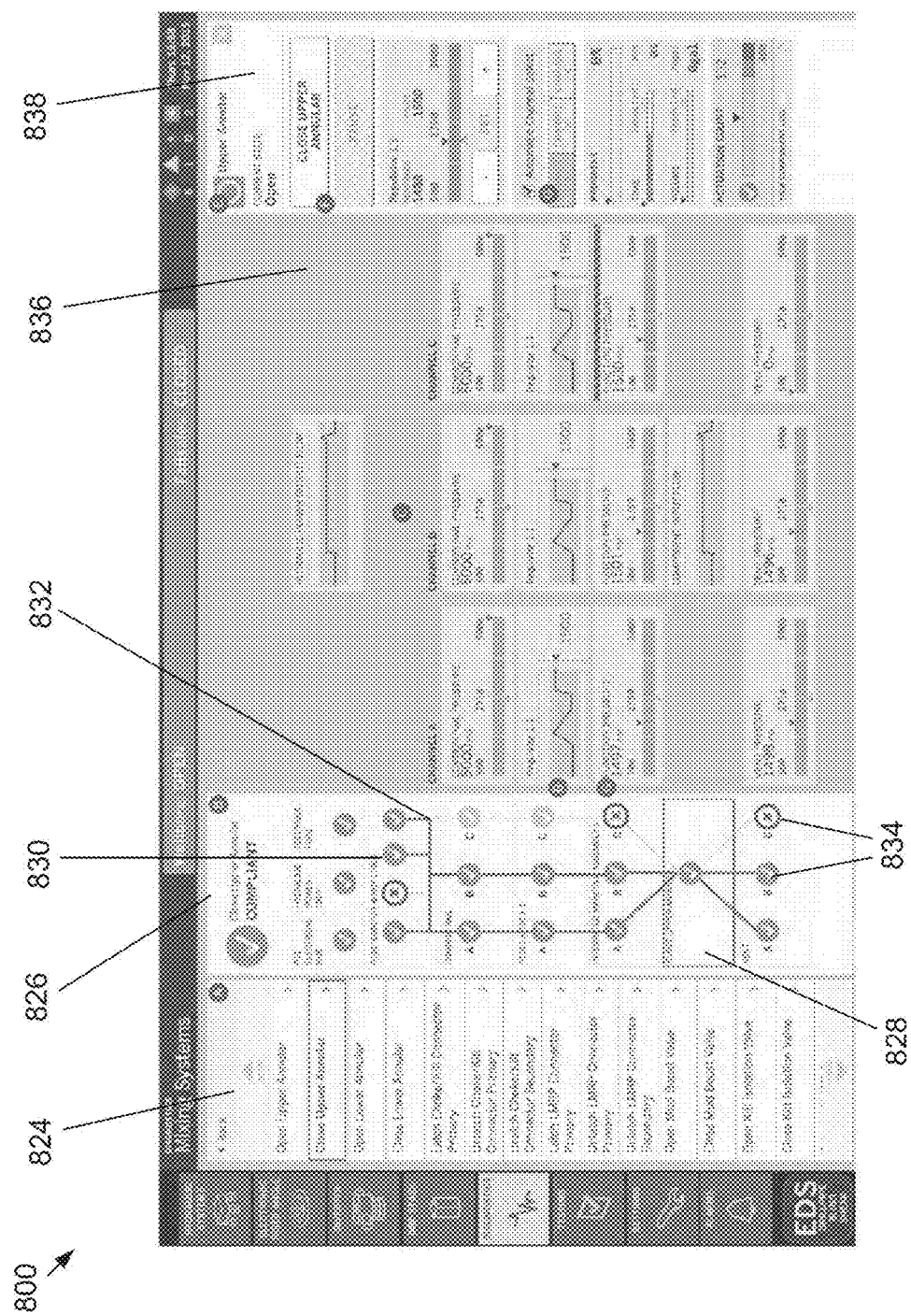
FIG. 8D shows an embodiment of an exemplary GUI display when a user selects a regulatory compliance option according to an embodiment of the HMI system.

FIG. 8D shows an embodiment of an exemplary GUI display 800 displaying detailed compliance data. The display 800 shown in FIG. 8D may be displayed upon a user selection of a primary compliance regulation 804 from regulatory status panel 802 shown in FIG. 8A. In the embodiment shown, various operating paths to specific BOP components may be illustrated. In the embodiment shown, a function navigation panel 824 may display a list of selectable BOP functions to allow a user to easily navigate to a desired function. Upon a user selection of a BOP function from function navigation panel 824, a diagnostics decision path tree 826 may be displayed. Decision path tree 826 may represent the regulatory compliance states of all rig components involved in performing the selected BOP function. Diagnostics decision path tree 826 may comprise levels 828, nodes 830, and pathways 832 that can connect certain nodes together. Each level 828 may correspond to a particular rig component and each node 830 may correspond to a particular function performed by that component. In the embodiment shown, levels 828 correspond to components such as an integrated manifold assembly, a regulator, a common rail, and a rigid conduit and hot lines that are involved with performing the Close Upper Annular function selected by the user in function navigation panel 824. At each of the nodes 830, an icon 834 may be displayed that may inform the user whether a particular function or component is operating properly and compliant with regulations.

Diagnostic details 836 may be displayed to assist the user in performing diagnostic functions. For example, in the embodiment shown, diagnostics decision path tree 824 may display all of the available hydraulic pathways through the rig components listed in levels 828 for the selected function. In the embodiment shown, each function may have three possible channels, each represented by a pathway 832 in decision path tree 826. Diagnostic details 836 may be displayed that may represent detailed measurements for each of these channels when a function is operated. In the embodiment shown, diagnostic details 836 may include regulator pressure, common rail pressure, function pressure, and vent pressure. The regulator pressure may be displayed as both an instantaneous value and a running trend. In the embodiment shown, a function control field 838 may be specific to the function selected in the function navigation panel 824. While function control field 838 may include multiple functions, only a selected function may be executed. In some embodiments, in function control field 838, the user may be able to choose which hydraulic source system may operate a function, or which channel of the integrated manifold may be activated. By accessing elements in diagnostic details 836 and function control field 838, the user may be able to access rig components or functionalities that may not be in compliance and perform corrective action. As the user performs corrective action, icons 834 may change to inform the user that a function or component that was previously non-compliant is now currently compliant.

When a user selects a level 828, the currently selected level may be displayed with a selection border of a particular color such as blue. A similar selection border may also denote currently selected functions from navigation panel 824 or other currently selected icons in the GUI display 800. In some embodiments, display 800 may change to correspond to the currently selected level. More specifically, upon a selection of a particular level 828, diagnostic details 836 may change to correspond to the selected level. For example, if a level 828 corresponding to an integrated manifold assembly is selected, display 800 may change to display diagnostic details 836 and function control field 838 associated with the integrated manifold assembly. The display may similarly change to correspond to the selection when a regulator, a common rail, or rigid conduit and hot lines is selected.

In some embodiments, upon a user selection of the corresponding level 828, an integrated manifold display may give a single view of the state of hydraulic pressures within an integrated manifold. Pressure readings may be read on both the input and output sides. Diagnostic details 836 may include integrated manifold summary information, electrical control statuses, and input and output pressures for each of three flow channels. Function control field 838 may change to display functions associated with the integrated manifold assembly that may be selected by the user to perform various diagnostic and/or corrective functions.

In some embodiments, upon a user selection of the corresponding level 828, a regulator display may give a single view of the state of hydraulic pressures within a regulator group. Pressure readings may be read on both the input and output sides of each regulator. The status and pressure readings from each regulator in a regulator group may be included in a summary of each regulator assembly. Diagnostic details 836 may include the regulator assembly summary information, electrical control statuses, and input and output pressures for each of three flow channels. Diagnostic details 836 may also display data and corresponding functions associated with each integrated manifold connected in a channel downstream from the regulator. The user may select one or more functions from diagnostic details 836 to navigate to the selected integrated manifold function. Function control field 838 may change to display functions associated with the regulator assembly that may be selected by the user to perform various diagnostic and/or corrective functions.

In some embodiments, upon a user selection of the corresponding level 828, a rigid conduit and hot lines display may give a single view of the state of hydraulic pressures within a hot line and rigid conduit valve package. Pressure readings may be read on both the input and output sides of each valve package. The status and pressure readings from each rigid conduit and hot line may be included in a summary of each valve package. Diagnostic details 836 may include the rigid conduit and hot line summary information, electrical control statuses, and input and output pressures for each of three flow channels. Diagnostic details 836 may also display data and corresponding functions associated with each rigid conduit and hot line valve package. The user may select one or more functions from diagnostic details 836 to navigate to the selected rigid conduit and hot line function. Function control field 838 may change to display functions associated with the valve package that may be selected by the user to perform various diagnostic and/or corrective functions.

In some embodiments, upon a user selection of the corresponding level 828, a common rails display may give a single view of the state of hydraulic pressures within a subsea system. Flow meters and pressure readings available from a downstream portion of a hot line and rigid conduit valve package may be displayed in diagnostic details 836. Diagnostic details 836 may also display data for each of the downstream regulator assemblies. The status and pressure readings from each regulator may be included in a summary of each regulator assembly. Diagnostic details 836 may also include common rail summary information and electrical control statuses. Diagnostic details 836 may also display data and corresponding functions associated with each regulator connected in a channel to the common rail. The user may select a particular regulator from diagnostic details 836 to navigate to functions corresponding to the selected regulator. In some embodiments, the system may navigate to a first default function for the selected regulator. As the user selects different regulators for diagnosis, decision path tree 826 may be modified to show a level 828 corresponding to the selected regulator as currently selected. Function control field 838 may change to display functions associated with the regulator that may be selected by the user to perform various diagnostic and/or corrective functions.

Figure 9:
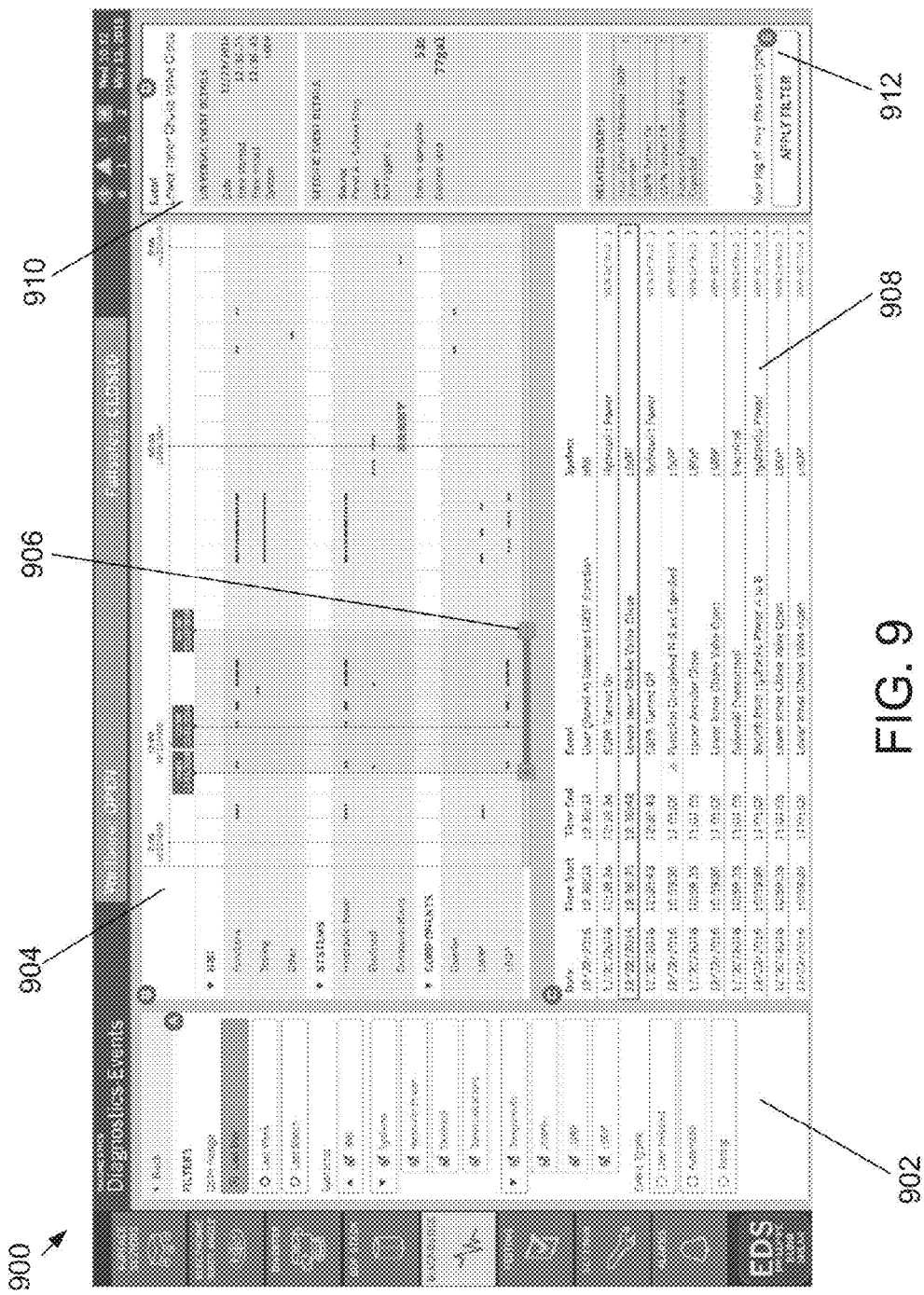
FIG. 9 shows an embodiment of an exemplary GUI display of a diagnostic event log according to an embodiment of the HMI system.

FIG. 9 shows an embodiment of an exemplary GUI display 900 of a diagnostic event log. In the embodiment shown, the event log may provide the user with information about the operation and performance of the entire BOP control system. In the embodiment shown, a series of filters for the events may be listed in a filter options field 902. These filters may include date ranges, affected systems, or event types. In the embodiment shown, a timeline field 904 of events may be displayed based on the filter options selected in filter options field 902. Sliding controls 906 may provide additional filtering functionality. Sliding controls 906 may be moved horizontally along the timeline to select a time interval for displayed events. The events within the selected time interval may be displayed in an event list field 908 in a tabular format and may display event details and attributes. A user may select an event from the timeline field 904 or event list field to display additional details about the selected event in detail field 910. The full event details may be presented in detail field 910 along with possible links to related events or affected systems. The user may select a filter icon 912 to quickly view other events of the same type as the selected event. Each event may comprise a number of attributes and values in order to provide value to the user through the interface. This will also enable the filtering and visualization features depicted in the Events Log screen.

Figure 10:
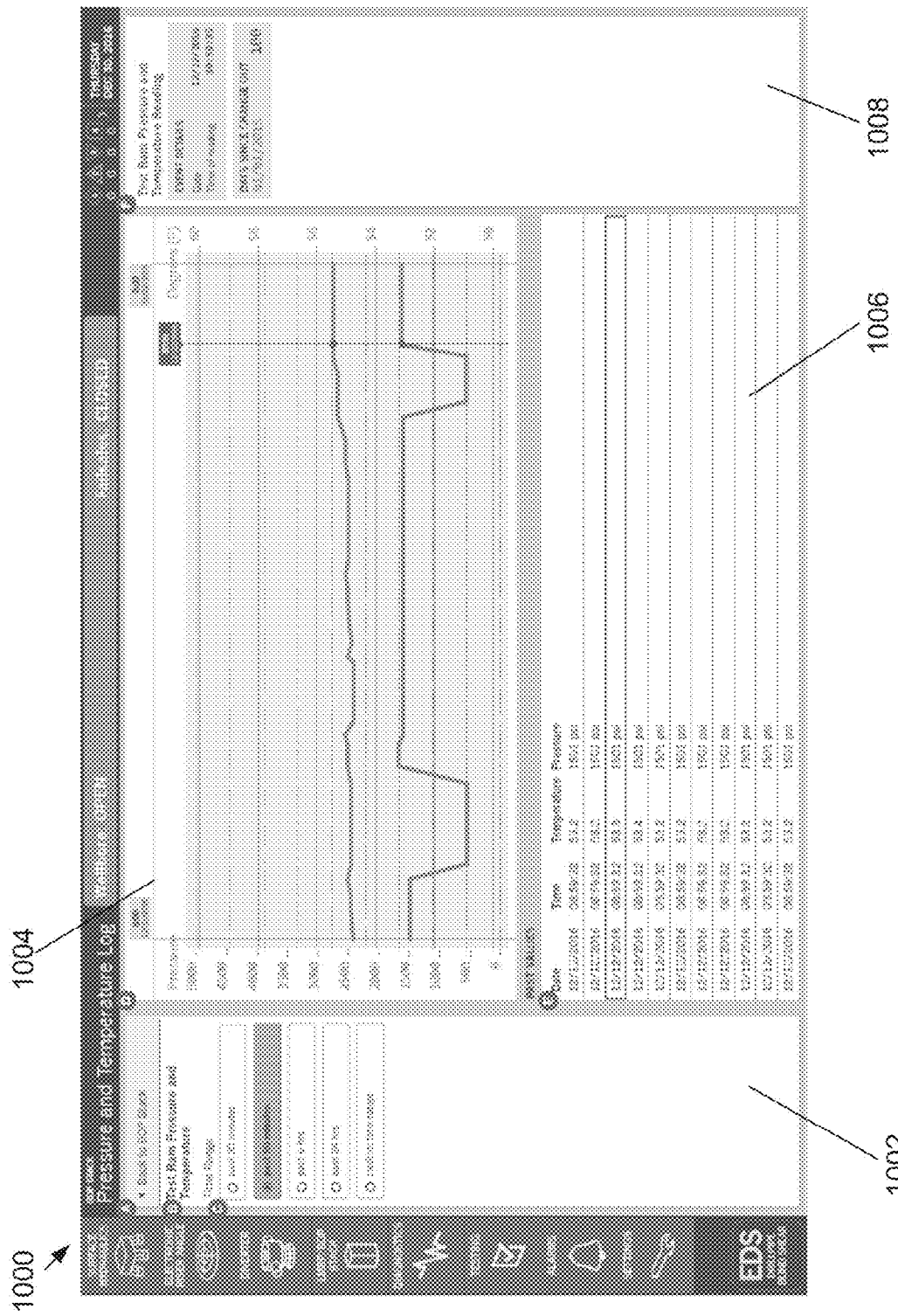
FIG. 10 shows an embodiment of an exemplary GUI display of a pressure/temperature log according to an embodiment of the HMI system.

FIG. 10 shows an embodiment of an exemplary GUI display 1000 of a pressure/temperature log. In the embodiment shown, a pressure/temperature log may display the historical data of a selected pressure and temperature sensor. In some embodiments, the pressure/temperature log may be accessed by a user selection of any of the pressure and temperature sensor readings of the visual status displays 322 shown in FIG. 3A. In the embodiment shown, a series of filters for the events may be listed in a filter options field 1002. While a selection of the pressure and temperature sensor from a particular visual status display 322 may have already applied certain filters, these filters may include time ranges and other filter types. In the embodiment shown, a visualization field 1004 may display temperature and pressure graphed over a time period selected from filter options field 1002. Detailed data points from the visualization field 1004 may be listed in a table 1006. Upon selection of an event from table 1006, additional details of the selected event and the component or sensor may be presented in detail field 1008.

Figure 11:
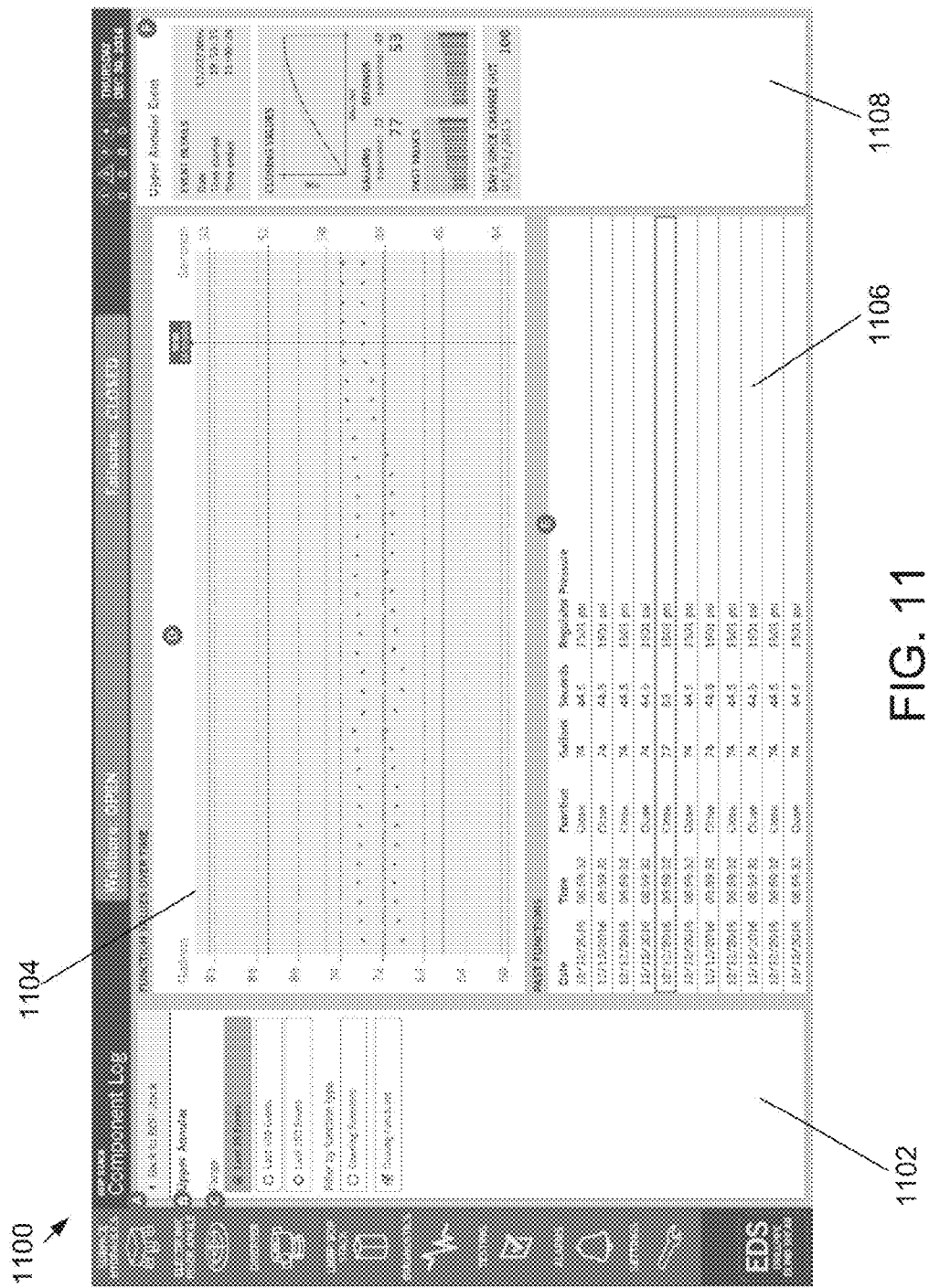
FIG. 11 shows an embodiment of an exemplary GUI display of a BOP Component log according to an embodiment of the HMI system.

FIG. 11 shows an embodiment of an exemplary GUI display 1100 of a BOP Component log. In the embodiment shown, a BOP component log may display the history of a component's functions. In the embodiment shown, a series of filters for the events may be listed in a filter options field 1102. These filters may include event number ranges and function types. In the embodiment shown, a visualization field 1104 may display data relevant to the selected function type and graphed over an event number range selected from filter options field 1102. In the embodiment shown, the historial gallons and seconds of an Upper Annular's Close function are both graphed for a specific number of past events. Detailed data points from the visualization field 1104 may be listed in a table 1106. Upon selection of an event from table 1106, additional details of the selected event and the component may be presented in detail field 1108.

Referring back to the embodiment shown in FIG. 8A, a Regulators category option icon 802 may display a single view of the state of the hydraulic pressures within subsea components. Canvas zone 206 may be used to display a representative depiction of regulators and their operation state. Each regulator may be named and metadata may include a description of affected components, an operational range, setpoint, and readback values. An Integrated Manifolds category option icon 802 may display a summary of all of the manifolds, and may allow the user to see details of valve positions and pressures within the manifolds. Canvas zone 206 may be used to display a representative depiction of integrated manifolds and their operation state. Each manifold may have several valves and pressure readings.

The Communications system corresponding to category option icon 802 may be responsible for transferring commands and data between the various HMI interfaces and the physical subsea components and may display a representative depiction of the communications network. Each node in the communication network may have the ability to monitor several self-diagnostic attributes such as temperature and water ingress. Examples of information that may be available for diagnostics include a state of physical media links, a log of communications activity, a communications message counter, communication nodes status, and communication packet corruption detection.

A Hydraulics category option icon 802 may display a list of Hydraulic power sources to allow for easy navigation. Canvas zone 206 may be used to display a representative depiction of pumps and motors and their operation state. Clicking on an item in the Hydraulic power sources section may update the view in canvas zone 206. A new event may be generated for each time a motor starts. These events may be depicted to show how many motors run and their impact on overall system performance. Current events may be displayed in more detail. Motors that are currently running may be depicted with trend lines while non-operating motors may have a high-level summary of their state displayed. A Reservoir category option icon 802 may display a representative depiction of fluid reservoirs. An Electrical system corresponding to category option icon 802 may be responsible for transferring electrical power from the surface to the subsea components and may display a representative depiction of the electrical network. The electrical network may be similar to the communications network, but may display electrical measurements.

Figure 12:
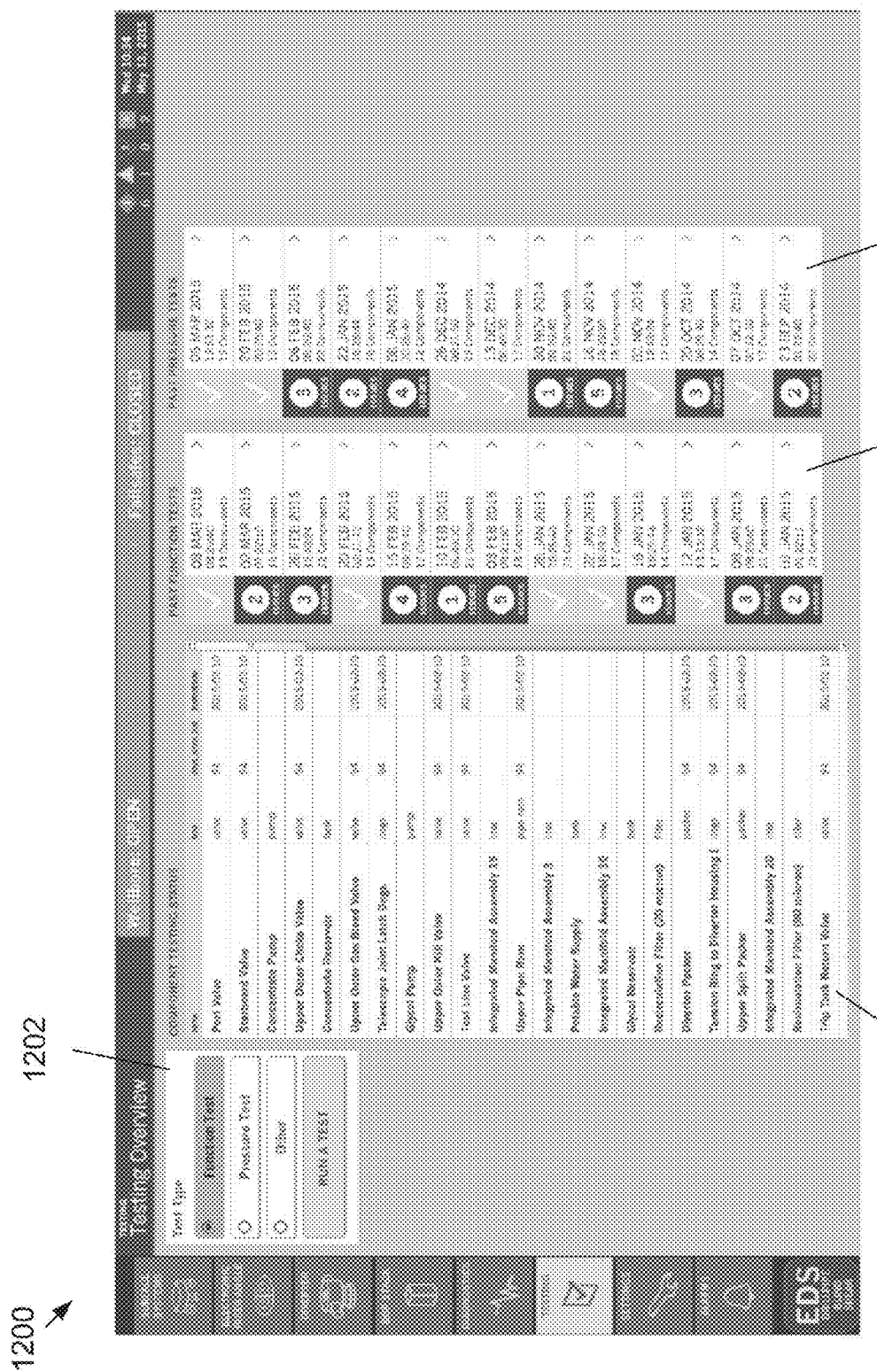
FIG. 12 shows an embodiment of an exemplary GUI display when a user selects a Testing option according to an embodiment of the HMI system.

FIG. 12 shows an embodiment of an exemplary GUI display 1200 when a user selects a Testing option. The Testing screens may give users automated recording mechanisms for periodic tests that are required by regulatory bodies, and that help with early detection of functional issues. In some embodiments, the testing system may facilitate the running of function tests and pressure tests in both a manual way (e.g., full user interaction) and a guided way (e.g., periodic user interaction). The system may also keep a count and be able to display the number of times a device is operated (e.g., opened or closed). Function tests may have programmed expected gallon counts, and times to close/open. The system may also indicate when expected gallon counts or times to close/open are exceeded and may track maintenance data on each part of the BOP. Information tracked might include but might not be limited to install date, part number, last checked date, and number of operations.

GUI display 1200 may comprise a test category field 1202 that gives the user options to perform a new test, a test status field 1204 comprising a table displaying operational information about individual system components, and a past function test field 1206 and a past pressure test field 1208 for showing recently performed function and pressure tests. The test status field 1204 gives the user information about each component including the number of actuations and the last operated time and/or date. This information may be used to determine whether or not a component should be tested or not. Each prior test listed in past function test field 1206 and past pressure test field 1208 may include a check mark if the tests passed or an indication of the number of issues that were found. Clicking on one of these items may display a Test Report to the user.

In the some embodiments, the HMI may support three types of tests: Function tests, Pressure tests, and Other tests. Function tests may typically be run every 7-14 days and may take a couple of hours to complete. If the operator selects Function Test from test category field 1202, test status field 1204 may be populated with components that are due to be tested. In some instances, the user can add or remove components before starting the test. The user can function components in any order, which may be reflective of normal BOP functioning. A Results page may be viewed after the desired tests are performed. Items that need attention would go to the top of the list and details about each item may be viewed by selecting an item on the list. Pressure tests may typically be run every 14-21 days and may take several hours to complete. If the operator selects Pressure Test from test category field 1202, the system would follow the pattern from the Function Test described above. The system may allow for unstructured "other" tests to be recorded which may allow for a more granular analysis, as the event log identifies all actions during this time as part of a test. For example, if the user wants to perform a simple sensor-based test like a Casing Integrity test, selecting "Other" would allow the user to select as many or as few components or sensors to be recorded as needed. The system may then allow the user to run the test on his own without any extra overhead. The big benefit to the user may be the automated recording of all sensors and components from the test.

Once a test has been selected from test category field 1201, the user may enter some general information about this test and select a subset of components to be tested. Information about that particular test instance may be recorded by the user. Several fields can be automatically populated based on information that is unlikely to change (e.g., Rig and Well) as well as information that the system is likely to already know (e.g., dates). Components to be tested may be selectable from the list of all components. Selection may be defaulted to include only those components that have not been tested or operated within an allowable time period.

When the user begins a test, the user may be guided through the operation of each selected component or may choose components at will to test. The user may choose to follow the list in order or select items as desired. Components may be selected for testing either through a navigational list or a component diagram. The component may then be operated as normal through the typical operator interface shown in the BOP Stack screen of FIG. 3A. This guided testing may be beneficial to the user by drastically reducing the time the user spends testing. It may also reduce overall testing time of the rig components, increasing the time the components may be available to perform their respective functions.

When testing is complete, a results summary page can be reviewed to allow the user to understand errors and look for impending conditions that may impact operational ability. The user may select options to edit and save overview attributes of the test. A Component Report table may display warnings, errors, and basic status of the testing of each component. Details of that component's test may be also be displayed. Associated sensor values may also be recorded and displayed based on the component that was functioned. Details of the selected component may also be displayed, including information about similar prior tests, allowing the user to see how the current test related to other test or operation events.

Figure 13:
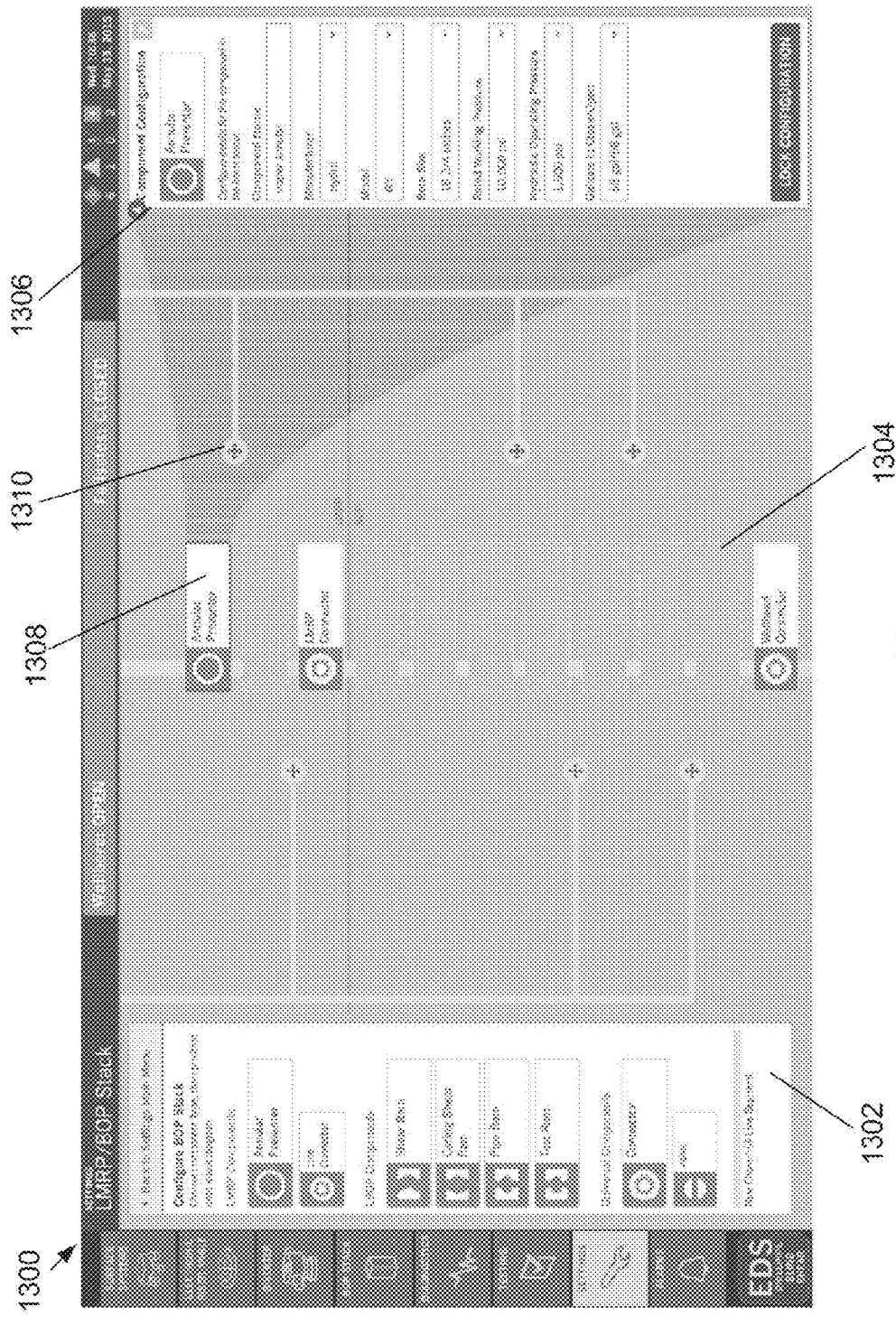
FIG. 13 shows an embodiment of an exemplary GUI display when a user selects a System Settings option according to an embodiment of the HMI system.

FIG. 13 shows an embodiment of an exemplary GUI display 1300 when a user selects a System Settings option. The System Settings screens may allow for configuration of the software to match the hardware and procedures for a particular rig environment. The Settings option may be used to make choices about how the BOP system will function. This may include a system operation mode and the pre-selected, or default, choices for auto-sequences such as the diverter auto-close sequence or the emergency disconnect sequence. Some changes may require a user login to apply to ensure that only user having necessary credentials may change the system settings.

The user may also configure the components of the BOP. This will typically be done at BOP commissioning on the rig, or during major overhauls to the equipment. A component field 1302 may display various components that can be added to a BOP diagram 1304 displayed in canvas zone 206. The user may use BOP diagram 1304 as a blueprint to assemble the virtual BOP stack interface. Configuration field 1306 may comprise overall system parameters as well as detailed component parameters. The overall stack configuration can be entered including number of annulars, preventer, and valves. In some embodiments, the user may click and drag a component symbol 1308 from component field 1302 to a location in the BOP diagram 1304. The user may add choke and kill lines to the BOP diagram 1304 by dragging and dropping line components 1310. Each component may have specific attributes that may be used throughout the operation of the system and in managing maintenance plans. In some embodiments, clicking on a component symbol 1308 may open an editable interface to input attributes of the component including name, manufacturer information, and sizes.

The system may have a number of automated sequences to put the system into a known configuration of component states. These configurations may be defined prior to operations, and may be re-defined at a later time. The system may provide programmable interfaces to create logic-based conditions and reactions. For example, guided procedures for well control activities such as shut-in may be provided. Components can be added, removed, or reordered by the user.

In some embodiments, an Alarm Rules screen may allow the user the ability to view detailed information about alarm rules and an Alarm Configuration Screen may allow the user the ability to configure any number of alarms. For example, the BOP control system may be augmented with input from gas sensors in critical drilling areas. Alarms may be triggered by these sensors and reaction procedures initiated by the system. Alarms may be configurable to trigger on components due for maintenance based on usage. When in an editing mode, the alarm parameters may become fields that logically map to the type of information that may be entered, including radio buttons, pull-down lists, and text fields.

At times, when components or their functions fail, or during various operating phases or states, operators may want to lock out interface control. The operator may have the ability to define a function on a specific channel or across all channels. When lockouts are changed, the operator may need to apply the changes before they will take effect. Changes may also be discarded and the lockouts returned to the default state. Various System Modes may create lockouts that may be defined by the operator as modes of operation. Each mode can be defined as a collection of components and states. Components and states may be added, removed, or moved by the user.

Operating procedures shall can define how account access is set up. Login accounts may be created and shared or given to individuals. When configuring accounts, account information may be displayed in a tabular format. Basic account information may include user name, password, first name, last name, email address and/or other contact information, operator role or type (e.g., Subsea Engineer, Driller, Tool Pusher, etc.), and access level. The list of accounts may be editable by those with a certain level of account privileges. Additional information may be stored with each user account and may include details about prior activities and last login time/date.

Figure 14:
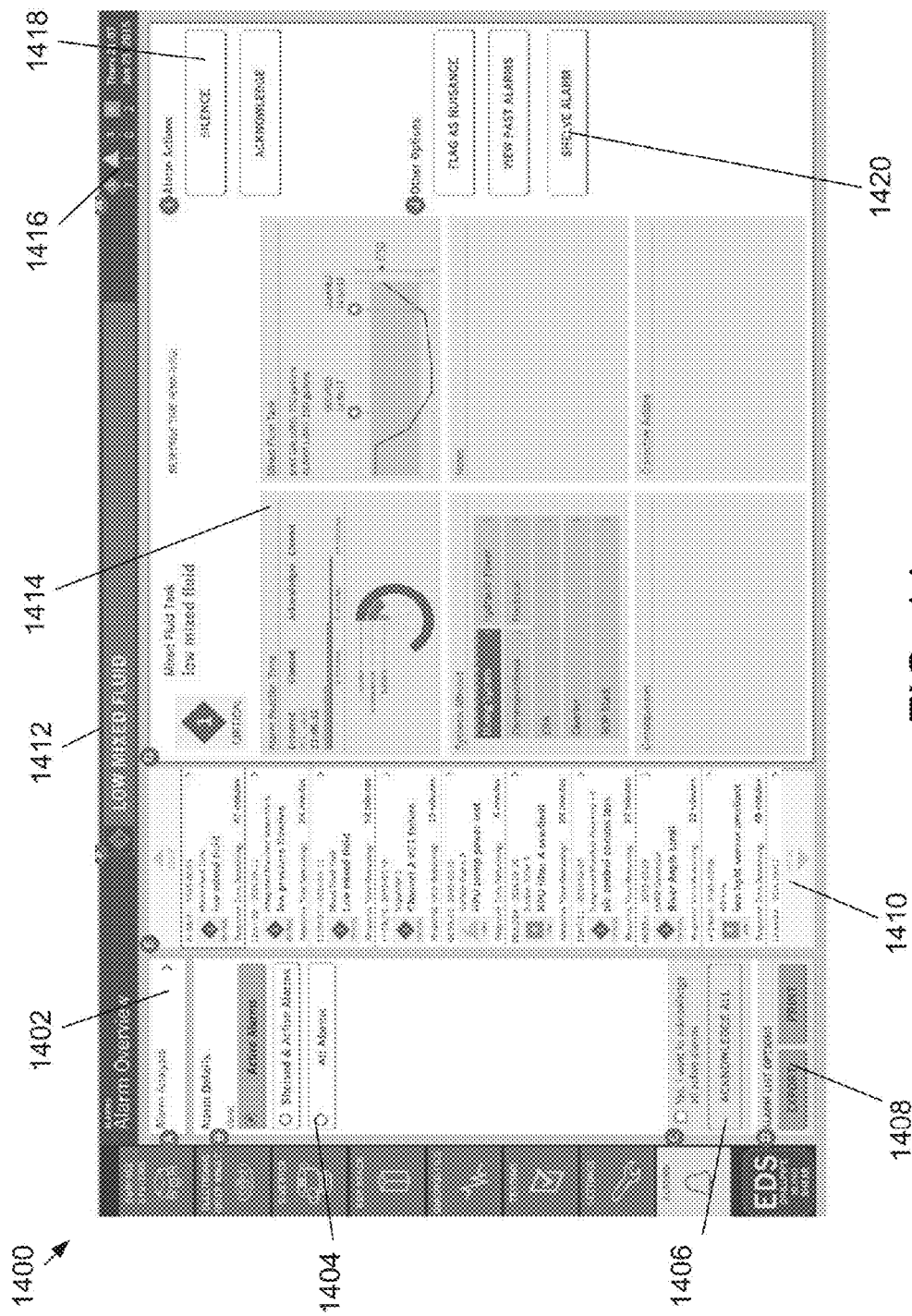
FIG. 14 shows an embodiment of an exemplary GUI display when a user selects an Alarms option according to an embodiment of the HMI system.

FIG. 14 shows an embodiment of an exemplary GUI display 1400 when a user selects an Alarms option. An alarm may be an audible and/or visible means of indicating to the user an equipment malfunction, process deviation, or abnormal condition that requires action. The alarm may indicate a problem that requires a response, not a normal process condition. An Alarm Overview screen may give the user quick access to the most urgent, active alarms, and enable the user to take corrective action. The user may perform corrective actions while on an alarms page or may navigate to the BOP system page that is experiencing the alarm event to obtain additional context on the cause. Alarm analysis icon 1402 may allow the user to navigate to an Alarm Analysis page, where users can view and manipulate data visualizations such as "alarm response time by event." The user may select an alarm selection option 1404 to access alarms by category. Active alarms may be selected and shown by default, and, in some embodiments, all active alarms may be shown at all times to the user. The user may choose to show shelved alarms or all alarms in addition to active alarms by selecting the appropriate alarm selection option 1404. In some embodiments, the user may select global acknowledge icon 1406 to have the option to acknowledge all active alarms at once. For convenience, the alarm list can be exported as a PDF document or printed by selecting a list output option 1408. In alarm list field 1410, alarms may listed in the order that they occur so that users can determine if there are any dependencies across the alarms. The user may select an entry in alarm list field 1410 to populate status bar 1412 and alarm information field 1414. A selected active alarm may appear as a notification in the status bar 1412. The notification may include an alarm priority level and an alarm message. The details of the selected alarm may appear in alarm information field 1414 and include the response time remaining, alarm reaction time, a visualization of the values that tripped the alarm, and the affected system.

In the embodiment shown, an alarm reaction time visualization may inform the user of the times the alarm was triggered, silenced, acknowledged, and/or cleared. A user may select affected system details from alarm information field 1414 to navigate to a display providing additional details and context on the alarm and functions for addressing the alarm. Alarm data may be provided in alarm information field 1414 to show the user alarm activation points, alarm current values, and how the alarm values changed between the time the alarm occurred and the time the alarm was cleared. In the embodiment shown, alarm information field 1414 may include fields for the user to make notes after alarms are acknowledged or shelved. In some embodiments, alarm information field 1414 may list direct consequences of ignoring an active alarm and actions the user may take to correct the issue causing the alarm. An alarm overview bar 1416 may be displayed and may relate the number of active alarms across all priority levels. Alarm overview bar 1416 may be displayed persistently in system header 204 for all interface options. Any user may silence or acknowledge an alarm by selecting an alarm action button 1418. By selecting one or more alarm option buttons 1420, any operator may flag an alarm as a nuisance so that problem alarms can be identified during alarm maintenance. The Past Alarm button may allow the user to navigate to an Alarm Analysis screen, which may display a pre-filtered list of instances of this alarm type. Shelving an alarm, if available for a particular alarm, may prompt the user to make a note explaining the circumstances under which he chose to shelve it.

When an alarm is triggered, an alarm message may be displayed in the status bar 1412 at the top of the screen, and can be seen regardless of which screen is selected. Alarm notifications may also appear, when applicable, right on the alarming component or within its control panel. At all times, user can also see overall alarm status via alarm information field 1414 at the top right. Alarm information field 1414 may contain categories such as alarm reaction time, an analysis of the component related to the alarm, and a notation of the systems affected by the alarm. Other fields, such as notes, consequences of the alarm, and corrective actions, may be displayed. When an alarm is detected by the system and triggered, an audible warning may sound and the alarm message may appears in the status bar 1412. The message has a red-colored background and may blink, but the text displaying the priority level number and message may remain static so that they can be easily read by the user. The blinking may continue until the operator has selected the Acknowledge alarm action button 1418 for that alarm. The operator can select the Silence button to turn off the audible warning sound. To navigate to the Alarm Overview screen, the operator can tap anywhere on the status bar 1412. In some embodiments, when a user is accessing the BOP stack screen, an alarm indicator may appear on alarming components and may remain until the alarm has cleared.

After the user has seen an alarm notification, the user may review related alarm information in detail in alarm information field 1414. The alarm may remain in the alarm list field 1410 until it has both been cleared and been acknowledged by the user. To scroll through all of the alarms in alarm list field, the user can use scrolling buttons. The user may choose to tap the Shelve button in alarm option buttons 1420 for an active alarm in order to temporarily remove it from the alarm list field 1410. After a set duration (which can be adjusted in Settings), the alarm may reappear in the alarm list field 1410 to be managed like any other alarm.

Figure 15:
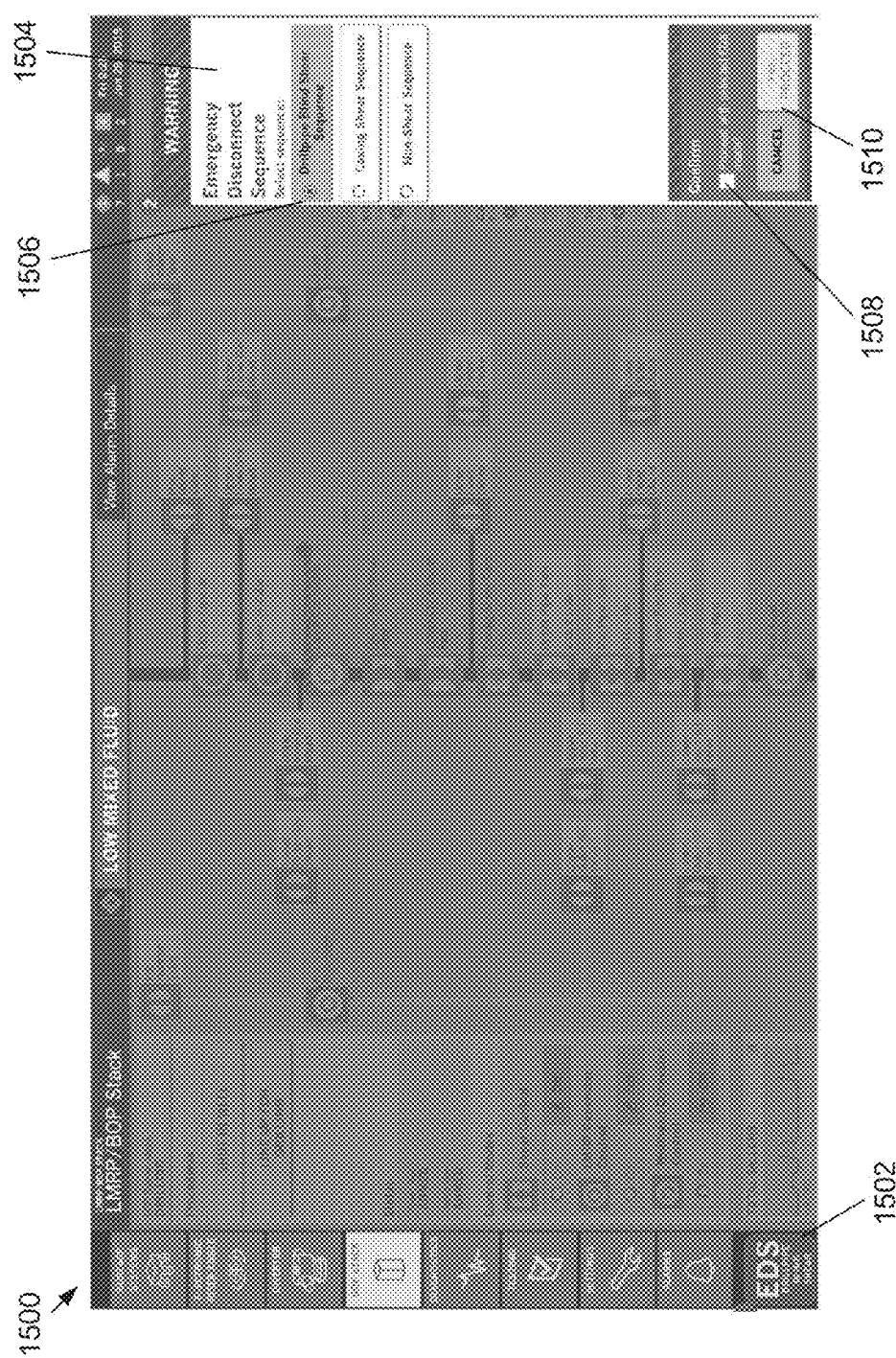
FIG. 15 shows an embodiment of an exemplary GUI display when a user selects an Emergency Disconnect Sequence (EDS) option according to an embodiment of the HMI system.

FIG. 15 shows an embodiment of an exemplary GUI display 1500 when a user selects an Emergency Disconnect Sequence (EDS) option. The EDS button 1502 may be persistent onscreen for all interface options. To initiate the process, the operator may select the EDS button, which may cause control panel 1504 to appear and a transparent screen to appear over the rest of the interface. This may bring more prominence to the control panel 1504 and strongly signal to the user that a destructive action is being started. The user may have the option to change the sequence type before firing the function by selecting one or more of sequence type buttons 1506. The user may then select the checkbox 1508 to confirm the intention to start EDS. At this point, the Proceed button 1510 may be disabled. When the user selects the checkbox 1508, the Proceed button 1510 may be activated. After the user selects the Proceed button 1510, the sequence may commence. As the equipment associated with EDS functions (e.g., unlatching choke and kill lines), text that describes may appear along with a function progress bar. Time and volume values may also be displayed. As the EDS sequence proceeds, the components on the BOP stack may show their status through color changes, blinking, and icon state changes. When the EDS sequence is complete, an Exit button (not shown) may appears at the bottom of the control panel 1504 which the user may select to dismiss the control panel. When this is done, the transparent screen may be removed. The changes to the components on the BOP stack may be reflected in their current states, shown on the BOP screen.

Figure 16:
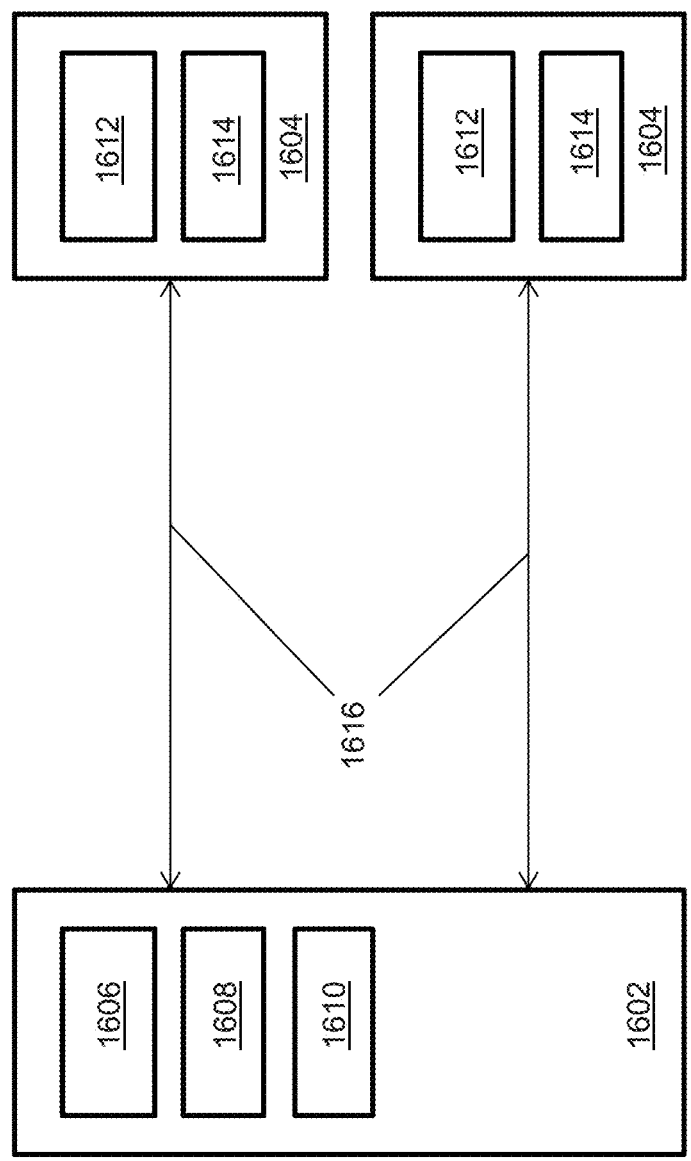
FIG. 16 shows an embodiment of an exemplary client-server interface according to an embodiment of the HMI system.

FIG. 16 shows an embodiment of an exemplary client-server interface according to an embodiment of the HMI system. In some embodiments, the HMI system may comprise one or more clients 1602 and one or more servers 1604 that may interact with each other. In the embodiment shown, client 1602 may be a hardware computing device that comprises one or more processors 1606, one or more memory devices 1608, and a user interface 1610. In the embodiment shown, servers 1604 may be hardware computing devices that comprise one or more processors 1612 and one or more software applications 1614. In some embodiments, the user may access client 1602 through user interface 1610 and enter inputs that instruct client 1602 to access one or more software applications 1614 from one or more servers 1604 to perform one or more different functions available in the HMI system. In the embodiment shown, client 1602 and servers 1604 may be connected via one or more wired and/or wireless networks 1616 (e.g., Ethernet, WAN, LAN, Wi-Fi, telephone switching network, and/or the like).

It may be appreciated that the functions described above may be performed by multiple types of software applications, such as web applications or mobile device applications. If implemented in firmware and/or software, the functions described above may be stored as one or more instructions or code on a non-transitory computer-readable medium. Examples include non-transitory computer-readable media encoded with a data structure and non-transitory computer-readable media encoded with a computer program. Non-transitory computer-readable media includes physical computer storage media. A physical storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other physical medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above are also included within the scope of non-transitory computer-readable media. Moreover, the functions described above may be achieved through dedicated devices rather than software, such as a hardware circuit comprising custom VLSI circuits or gate arrays, off-the-shelf semiconductors such as logic chips, transistors, or other discrete components, all of which are non-transitory. Additional examples include programmable hardware devices such as field programmable gate arrays, programmable array logic, programmable logic devices or the like, all of which are non-transitory. Still further examples include application specific integrated circuits (ASIC) or very large scale integrated (VLSI) circuits. In fact, persons of ordinary skill in the art may utilize any number of suitable structures capable of executing logical operations according to the described embodiments.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the disclosed methods, devices, and systems are not intended to be limited to the particular forms disclosed. Rather, they include all modifications and alternatives falling within the scope of the claims, and embodiments other than those shown may include some or all of the features of the depicted embodiment. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A computing system for implementing a human machine interface (HMI) application, the computing system comprising:
   a memory device; and
   at least one processor configured to enable the display of a graphical user interface (GUI) comprising one or more graphical elements configured to implement, using the at least one processor, one or more software applications stored on one or more servers, the one or more software applications configured to:
      initiate a session of the HMI application by receiving a user input on a user interface running or stored on a hardware device comprising at least one processor;
      enable the display of a plurality of non-overlapping zones comprising an action zone and one or more of:
         a high-level navigation zone comprising one or more selectable navigation options; and
         a system header zone;
      enable the display of a plurality of selectable action options in the action zone, the action zone comprising a plurality of non-overlapping subzones, the subzones comprising:
         an interface control subzone,
         an information subzone, and
         a system control subzone;
      enable the display of one or more selectable action options, the one or more selectable action options being displayed in predesignated subzones, wherein the plurality of selectable action options is modified based on a selection of the one or more selectable navigation options, wherein the selection is one or more of a user selection and a default selection;
      receive, at the hardware device, data representing a user selection of one of the one or more selectable action options; and
      control an operating state of one or more physical offshore drilling rig components based on the user selection.

2. The computing system of claim 1, the one or more selectable navigation options comprising one or more of:
   a blowout preventer (BOP) stack control option;
   a diagnostics option;
   a testing option;
   a settings option;
   an alarms option;
   a diverter option;
   a surface system option;
   an electronic riser angle option; and
   an emergency disconnect option.

3. The computing system of claim 2, the one or more software applications being further configured to, after receiving a user selection of the BOP stack control option:
   enable the display of a layout diagram comprising one or more selectable components in the information subzone, the layout diagram representing a current stack arrangement of the one or more physical offshore drilling rig components; and
   enable the display of one or more control options in the interface control subzone, the one or more control options comprising one or more of:
      one or more control procedures, and
      one or more destructive function control modes.

4. The computing system of claim 2, the one or more software applications being further configured to, after receiving a user selection of the settings option:
   enable the display of a drag-and-drop interface comprising one or more component icons located in the interface control subzone, the component icons representing one or more physical rig components; and
   enable the display of metadata, the metadata describing the one or more physical rig components.

5. The computing system of claim 2, the one or more software applications being further configured to, after receiving a user selection of the diagnostics option:
   enable the display of one or more system diagnostic options in the interface control subzone, the one or more system diagnostic options comprising one or more of:
      a component diagnostic option,
      a function diagnostic option, and
      an event diagnostic option; and
   enable the display of one or more control options in the system control subzone, the one or more control options corresponding to the user selection of one of the one or more system diagnostic options.

6. The computing system of claim 2, the one or more software applications being further configured to, after receiving a user selection of the testing option:
   enable the display of one or more system testing type options in the interface control subzone, the one or more system testing type options comprising one or more of:
      a function testing option, and
      a pressure testing option;
   enable the display of one or more test information fields in the information subzone, the one or more test information fields comprising one or more of:
      test status information, and
      test history information; and
   after receiving a user selection of one of the one or more system testing type options, enable the display of one or more selectable test options.

7. The computing system of claim 1, where the GUI comprises a single active interface window or a plurality of active interface windows and where the GUI displays:
   the action zone in a central portion of the GUI;
   the interface control subzone on a right side portion of the action zone;
   the information subzone in a central portion of the action zone; and/or
   the system control subzone on a left side portion of the action zone.

8. The computing system of claim 1, the HMI application further configured to:
   enable a display of a color palette comprising a red color and a green color;
   display a red color to indicate one or more abnormal component states; and
   display a green color to indicate one or more of an error-free operating status and a physical rig configuration having all rig components correctly configured for a particular rig operation.

9. The computing system of claim 2, the one or more software applications being further configured to, after receiving a user selection of the diagnostics option, enable the display of one or more system diagnostic options comprising one or more of:

a regulatory compliance option;
an operational status option; and
an event log option.

10. The computing system of claim 9, the one or more software applications being further configured to, after receiving a user selection of the regulatory compliance option, enable the display of a diagnostic decision path tree comprising one or more levels, one or more nodes, and one or more pathways connecting the one or more nodes, each of the one or more nodes comprising an icon representing a current diagnostic state of one or more rig components.

11. A method of implementing a human machine interface (HMI) application, the method comprising:
    initiating a session of the HMI application by receiving a user input on a user interface running or stored on a hardware device comprising at least one processor;
    enabling the display of a plurality of non-overlapping zones comprising an action zone and one or more of:
        a high-level navigation zone comprising one or more selectable navigation options; and
        a system header zone;
    enabling the display of a plurality of selectable action options in the action zone, the action zone comprising a plurality of non-overlapping subzones, the subzones comprising:
        an interface control subzone,
        an information subzone, and
        a system control subzone;
    enabling the display of one or more selectable action options, the one or more selectable action options being displayed in predesignated subzones, wherein the plurality of selectable action options is modified based on a selection of the one or more selectable navigation options, wherein the selection is one or more of a user selection and a default selection; and
    receiving, at the hardware device, data representing a user selection of one of the one or more selectable action options; and
    controlling an operating state of one or more physical offshore drilling rig components based on the user selection.

12. The method of claim 11, the one or more selectable navigation options comprising one or more of:
    a blowout preventer (BOP) stack control option;
    a diagnostics option;
    a testing option;
    a settings option;
    an alarms option;
    a diverter option;
    a surface system option;
    an electronic riser angle option; and
    an emergency disconnect option.

13. The method of claim 12, further comprising, after receiving a user selection of the BOP stack control option:
    enabling the display of a layout diagram comprising one or more selectable components in the information subzone, the layout diagram representing a current stack arrangement of the one or more physical offshore drilling rig components; and
    enabling the display of one or more control options in the interface control subzone, the one or more control options comprising one or more of:
        one or more control procedures, and
        one or more destructive function control modes.

14. The method of claim 12, further comprising, after receiving a user selection of the settings option:
    enabling the display of a drag-and-drop interface comprising one or more component icons located in the interface control subzone, the component icons representing the one or more physical rig components; and
    enabling the display of metadata, the metadata describing the one or more physical rig components.

15. The method of claim 12, further comprising, after receiving a user selection of the diagnostics option:
    enabling the display of one or more system diagnostic options in the interface control subzone, the one or more system diagnostic options comprising one or more of:
        a component diagnostic option,
        a function diagnostic option, and
        an event diagnostic option; and
    enabling the display of one or more control options in the system control subzone, the one or more control options corresponding to the user selection of one of the one or more system diagnostic options.

16. The method of claim 12, further comprising, after receiving a user selection of the testing option:
    enabling the display of one or more system testing type options in the interface control subzone, the one or more system testing type options comprising one or more of:
        a function testing option, and
        a pressure testing option;
    enabling the display of one or more test information fields in the information subzone, the one or more test information fields comprising one or more of:
        test status information, and
        test history information; and
    after receiving a user selection of one of the one or more system testing type options, enabling the display of one or more selectable test options.

17. The method of claim 11, where the GUI comprises a single active interface window or a plurality of active interface windows and where the GUI displays:
    the action zone in a central portion of the GUI;
    the interface control subzone on a right side portion of the action zone;
    the information subzone in a central portion of the action zone; and/or
    the system control subzone on a left side portion of the action zone.

18. The method of claim 11, further comprising:
    enabling a display of a color palette comprising a red color and a green color;
    displaying a red color to indicate one or more abnormal component states; and
    displaying a green color to indicate one or more of an error-free operating status and a physical rig configuration having all rig components correctly configured for a particular rig operation.

19. The method of claim 12, further comprising, after receiving a user selection of the diagnostics option, enabling the display of one or more system diagnostic options comprising one or more of:
    a regulatory compliance option;
    an operational status option; and
    an event log option.

20. The method of claim 19, further comprising, after receiving a user selection of the regulatory compliance option, enabling the display of a diagnostic decision path tree comprising one or more levels, one or more nodes, and one or more pathways connecting the one or more nodes, each of the one or more nodes comprising an icon representing a current diagnostic state of one or more rig components.

\* \* \* \* \*